United States Patent
Uchida et al.

(10) Patent No.: US 9,310,619 B2
(45) Date of Patent: Apr. 12, 2016

(54) OPTICAL FILM

(71) Applicants: Sharp Kabushiki Kaisha, Osaka-shi, Osaka (JP); TOHOKU UNIVERSITY, Sendai-shi, Miyagi (JP)

(72) Inventors: Tatsuo Uchida, Sendai (JP); Yoshito Suzuki, Sendai (JP); Tohru Kawakami, Sendai (JP); Kazuo Sekiya, Sendai (JP); Masahiro Nishizawa, Sendai (JP); Takahiro Ishinabe, Sendai (JP); Katsunori Ehara, Sendai (JP); Yoshihiro Hashimoto, Osaka (JP); Yasuhisa Itoh, Osaka (JP); Yoshitaka Yamamoto, Osaka (JP); Yutaka Ishii, Osaka (JP)

(73) Assignees: Sharp Kabushiki Kaisha, Osaka (JP); Tohoku University, Miyagi (JP)

( * ) Notice: Subject to any disclaimer, the term of this patent is extended or adjusted under 35 U.S.C. 154(b) by 0 days.

(21) Appl. No.: 14/377,957

(22) PCT Filed: Feb. 15, 2013

(86) PCT No.: PCT/JP2013/053727
§ 371 (c)(1),
(2) Date: Aug. 11, 2014

(87) PCT Pub. No.: WO2013/122214

PCT Pub. Date: Aug. 22, 2013

(65) Prior Publication Data

US 2015/0036215 A1 Feb. 5, 2015

(30) Foreign Application Priority Data

Feb. 15, 2012 (JP) ................. 2012-030994

(51) Int. Cl.
*G02B 5/30* (2006.01)
*G02B 27/28* (2006.01)
*G02B 5/02* (2006.01)
*G02B 5/04* (2006.01)
*G02F 1/1335* (2006.01)
*G02F 1/13363* (2006.01)

(52) U.S. Cl.
CPC ............ *G02B 27/285* (2013.01); *G02B 5/0242* (2013.01); *G02B 5/0278* (2013.01); *G02B 5/045* (2013.01); *G02B 5/3025* (2013.01); *G02B 5/3041* (2013.01); *G02B 5/3083* (2013.01); *G02F 1/133606* (2013.01); *G02F 1/13363* (2013.01); *G02F 1/133528* (2013.01); *G02F 2001/133607* (2013.01)

(58) Field of Classification Search
CPC ........................... G02B 5/3083; G02B 27/285
USPC ........... 359/485.01, 489.07, 489.09; 362/613, 362/620, 623, 626; 349/96, 117
See application file for complete search history.

(56) References Cited

U.S. PATENT DOCUMENTS 5,587,816 A * 12/1996 Gunjima .................. F21V 9/14
349/113
5,940,211 A * 8/1999 Hikmet ................ G02B 5/3083
359/487.06

(Continued)

FOREIGN PATENT DOCUMENTS

| JP | 08-190006 A | 7/1996 |
| JP | 2010-072287 A | 4/2010 |
| WO | 2004/015330 A1 | 2/2004 |

OTHER PUBLICATIONS

Official Communication issued in International Patent Application No. PCT/JP2013/053727, mailed on May 14, 2013.

*Primary Examiner* — Ricky D Shafer
(74) *Attorney, Agent, or Firm* — Keating & Bennett, LLP

(57) ABSTRACT

To provide a thin optical sheet having improved efficiency for light utilization, an optical sheet (5) of one mode of the present invention includes, in sequence from a light entry side to a light emission side, a plurality of first prisms (13), a ¼ wavelength plate (11), and a polarized-light separating element (12), the plurality of first prisms (13) each having (i) a first surface (13a) through which light enters the first prism and (ii) a second surface (13b) that reflects the light, having entered the first prism, toward the light emission side, the optical film further including, between the plurality of first prisms in an in-plane direction of the optical film, a second prism (14) that reflects light.

7 Claims, 19 Drawing Sheets

(56) References Cited

U.S. PATENT DOCUMENTS

| | | | | |
|---|---|---|---|---|
| 5,982,540 A | * | 11/1999 | Koike | G02B 6/0056 349/62 |
| 6,515,785 B1 | * | 2/2003 | Cobb, Jr. | G02B 5/0236 349/62 |
| 6,975,455 B1 | * | 12/2005 | Kotchick | G02B 5/305 359/485.03 |
| 7,530,720 B2 | * | 5/2009 | Shimura | G02B 6/0053 362/606 |
| 2009/0167981 A1 | * | 7/2009 | Arai | G02F 1/133606 349/62 |

* cited by examiner

48: Polarized light separating element

Polarized-light transmission axis

47: 1/4 wavelength plate

Slow axis

46: Phase-difference plate

Slow axis

45: Prism array

OPTICAL FILM

TECHNICAL FIELD

The present invention relates to an optical film, a backlight, and a liquid crystal display device.

BACKGROUND ART

In recent years, a typical liquid crystal display device includes a backlight and a liquid crystal panel, the liquid crystal panel including two polarizers and a liquid crystal layer sandwiched between the two polarizers. A typical liquid crystal display device displays an image by controlling the alignment of liquid crystal molecules by means of voltage. The backlight emits light, which enters the liquid crystal panel in an unpolarized state. Thus, half of the light is absorbed by the polarizer through which the light first passes.

Patent Literature 1 discloses a technique for reducing a light loss caused by a polarizer. The technique of Patent Literature 1 provides a polarized-light selection reflecting surface on a light entry side of a prism array, and also provides a ¼ wavelength plate and a reflecting mirror on a side toward which light reflected by the polarized-light selection reflecting surface travels. The light source emits light toward the polarized-light selection reflecting surface, the light including polarized light that is incapable of passing through the polarized-light selection reflecting surface. Such polarized light is reflected by the polarized-light selection reflecting surface to subsequently strike the ¼ wavelength plate and the reflecting mirror, which are provided ahead of the reflected light. For improved efficiency for light utilization, the polarized light reflected by the polarized-light selection reflecting surface needs to be changed into polarized light that is capable of passing through the polarized-light selection reflecting surface and to be then emitted to the polarized-light selection reflecting surface again. To achieve such an arrangement, the technique of Patent Literature 1 disposes the ¼ wavelength plate and the reflecting mirror at such positions that the ¼ wavelength plate and the reflecting mirror are located apart from the prism array and the polarized-light selection reflecting surface provided on the side toward which light reflected by the polarized-light selection reflecting surface travels. With this arrangement, (i) P polarized light, for example, included in the light emitted by the light source passes through the polarized-light selection reflecting surface, whereas S polarized light included in the light is reflected by the polarized-light selection reflecting surface, (ii) the S polarized light reflected by the polarized-light selection reflecting surface passes through the ¼ wavelength plate and is then reflected by the reflecting mirror to become P polarized light to be emitted again to the polarized-light selection reflecting surface, and (iii) the P polarized light thus emitted passes through the polarized-light selection reflecting surface. The above arrangement consequently allows reuse of reflected polarized light.

CITATION LIST

Patent Literature 1

Japanese Patent Application Publication, Tokukaihei, No. 8-190006 A (Publication Date: Jul. 23, 1996)

SUMMARY OF INVENTION

Technical Problem

According to the technique of Patent Literature 1, both the polarized-light selection reflecting surface and the ¼ wavelength plate are in contact with air, which has low refractive index. The polarized-light selection reflecting surface and the ¼ wavelength plate thus reflect light unnecessarily at their respective interfaces, with the result of decreased efficiency for reuse of polarized light. Further, according to this technique, the prism array and the polarized-light selection reflecting surface are apart from the polarized light converting elements (namely, the ¼ wavelength plate and the reflecting mirror). This problematically results in a backlight having large thickness and requires fixing means for each member.

The present invention has been accomplished in view of the above problems. One mode of the present invention is a thin optical film having improved efficiency for utilization of light of a light source.

Solution to Problem

An optical film of the present invention is an optical film including, in sequence from a light entry side of the optical film to a light emission side of the optical film: a plurality of first prisms; a first phase-difference plate; and a polarized-light separating element, the plurality of first prisms each having (i) a first surface through which light enters the first prism and (ii) a second surface that reflects the light, having entered the first prism through the first surface, toward the light emission side, the optical film further including, between the plurality of first prisms in an in-plane direction of the optical film, a light reflecting section that reflects light, having been reflected by the polarized-light separating element toward the light entry side, back toward the light emission side.

Advantageous Effects of Invention

An optical film of the present invention is an optical film including, in sequence from a light entry side of the optical film to a light emission side of the optical film: a plurality of first prisms; a ¼ wavelength plate; and a polarized-light separating element, the plurality of first prisms each having (i) a first surface through which light enters the first prism and (ii) a second surface that reflects the light, having entered the first prism through the first surface, toward the light emission side, the optical film further including, between the plurality of first prisms in an in-plane direction of the optical film, a light reflecting section that reflects light, having been reflected by the polarized-light separating element toward the light entry side, back toward the light emission side.

With the above arrangement, the optical film allows light having entered the optical film in an unpolarized state to be converted efficiently into polarized light that is capable of passing through the polarized-light separating element, and allows such polarized light to be emitted. Further, the polarized-light separating element and the ¼ wavelength plate are included in the optical film. This can reduce the difference in refractive index at the respective boundary surfaces of the polarized-light separating element and the ¼ wavelength plate, and can thus reduce Fresnel reflectance at the respective boundary surfaces of the polarized-light separating element and the ¼ wavelength plate, with the result of reduction in a light loss caused by Fresnel reflection. In addition, the polarized-light separating element, the ¼ wavelength plate, and the light reflecting section are included in the optical film. This allows production of a thin optical film that allows light in an unpolarized state to be converted into predetermined polarized light and that allows such polarized light to be emitted. Furthermore, since the polarized-light separating element, the ¼ wavelength plate, and the light reflecting section are included in the optical film, there is no need for, for example, alignment of the individual optical members. Also, the polarized-light separating element, the first phase-difference plate, and the light reflecting section, which are included in the optical film, may be stacked up on top of each other for integral production. This facilitates assembly of the optical film to an optical product such as a liquid crystal display device, and can consequently reduce the cost of producing an optical product including the optical film.

DESCRIPTION OF EMBODIMENTS

Embodiments of the present invention are described below in detail with reference to the drawings.

[Embodiment 1]
(Arrangement of Liquid Crystal Display Device)

Figure 1:
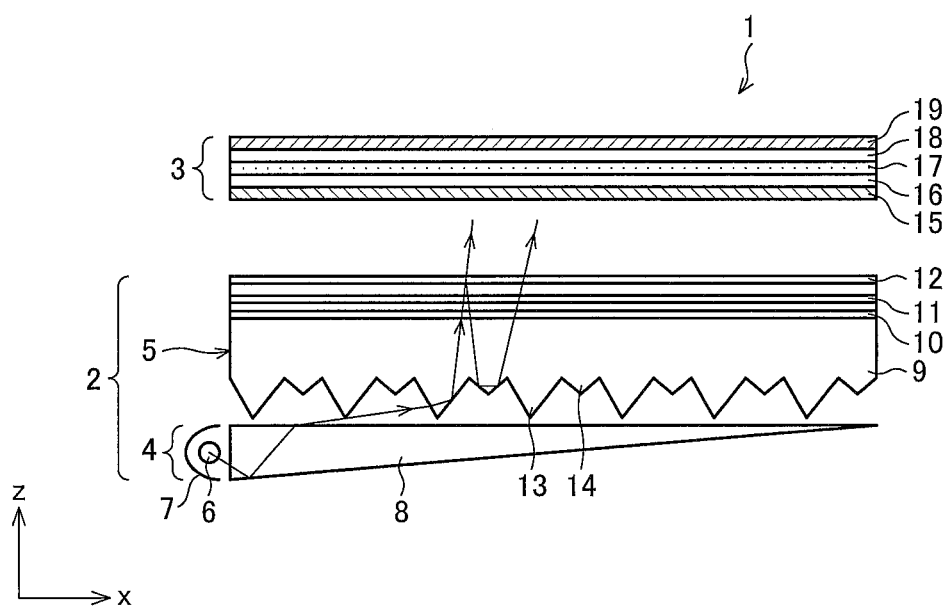
FIG. 1 is a cross-sectional view illustrating a configuration of a liquid crystal display device of one embodiment of the present invention.

FIG. 1 is a cross-sectional view illustrating a configuration of a liquid crystal display device 1 of the present embodiment. FIG. 1 shows arrows to indicate an example optical path of light from a light source 6. The liquid crystal display device 1 includes a backlight 2 and a liquid crystal panel 3 provided on a front surface side of the backlight 2 (that is, in the direction of a user). The description below uses (i) the term "x direction" to refer to a direction that extends from one end of the liquid crystal display device 1 at which end the light source 6 is provided to the other end, (ii) the term "z direction" to refer to a direction that extends from a back surface of the liquid crystal display device 1 to a front surface thereof, and (iii) the term "y direction" to refer to a direction perpendicular to the x direction and the z direction.

The backlight 2 includes a light-emitting section 4 and an optical sheet (optical film) 5 provided on a front surface side of the light-emitting section 4. The light-emitting section 4 includes a light source 6, a reflector 7, and a light guide plate 8.

The light source 6 is a cold cathode fluorescent tube in the present embodiment. The light source 6 is, however, not limited to that, and may be, for example, a white LED or a plurality of LEDs that individually emit light of the colors of R, G, and B. The white LED may be, for example, an LED including a blue LED chip and a plurality of fluorescent substances applied on the blue LED chip and having respective wavelength peaks for such colors as red and green. The light source 6 may alternatively be, instead of an LED, an organic EL device provided at an entry end of the light guide plate 8.

The description below uses the symbol "λ" to indicate the wavelength of a representative portion of light emitted by the light source 6. The representative wavelength λ may be, for example, a middle wavelength (for example, 550 nm for green) within a wavelength range (visible light range) of light emitted by the light source 6. The representative wavelength λ may be a green wavelength because the sight of the human being is sensitive to luminance of green light.

The reflector 7 reflects light from the light source 6 to collect it and cause it to converge at the entry end of the light guide plate 8. Light emitted by the light source 6 enters the light guide plate 8 through its entry end, which corresponds to a side surface of the light guide plate 8 which side surface faces the light source 6.

The light guide plate 8 has a cross section in a shape tapering from the entry end to the other end thereof, the thickness of the light guide plate 8 being larger at the entry end and smaller at the other end. The light guide plate 8 has a wedge shape in the present embodiment, but is not limited to such a shape. The light guide plate 8 may have asperities for light extraction on a surface opposite to an emission surface thereof. Light travels inside the light guide plate 8 from its entry end toward the other end while being reflected by surfaces of the light guide plate 8, and is emitted from the emission surface, which faces the optical sheet 5, toward the optical sheet 5. The light emitted from the light guide plate 8 is so greatly angled as to travel in a direction away from the light source 6 with respect to a direction perpendicular to the emission surface. The light emitted from the light guide plate 8, in other words, travels at an angle substantially parallel to the emission surface of the light guide plate 8.

The optical sheet 5 receives unpolarized light emitted from the light guide plate 8 and incident on a back surface of the optical sheet 5, changes the unpolarized light into linearly polarized light, and emits the linearly polarized light from a front surface (emission surface) thereof toward the liquid crystal panel 3. The optical sheet 5 includes a prism array 9, a phase-difference plate (wave plate, retardation plate) 10, a ¼ wavelength plate 11, and a polarized-light separating element 12 in that order from a back surface side of the optical sheet 5 to a front surface side thereof (that is, from a light entry side to a light emission side).

The prism array 9, provided on the back surface side of the optical sheet 5, includes a plurality of first prisms 13 and a plurality of second prisms (light reflecting sections) 14 provided in an in-plane direction of the optical sheet 5. The first prisms 13 each have a vertex angle (that is, the angle of its vertex) smaller than that of each second prism 14. The first prisms 13 and the second prisms 14 are provided alternately along the direction (x direction) extending away from the light source 6. A later description will deal in detail with how the optical sheet 5 is arranged.

The liquid crystal panel 3 controls the alignment state of liquid crystal molecules to determine whether to allow transmission of light emitted from the optical sheet 5 and incident on a back surface of the liquid crystal panel 3, and thus displays an image. The liquid crystal panel 3 includes a back surface polarizer 15, an active matrix substrate 16 including a plurality of pixel electrodes, a liquid crystal layer 17, a color filter substrate 18 including a common electrode and color filters for individual pixels, and a front surface polarizer 19 in that order from a back surface side of the liquid crystal panel 3 to a front surface side thereof (that is, from a light entry side to a light emission side). The back surface polarizer 15 has a polarized-light transmission axis identical in direction to that of the polarized-light separating element 12. This prevents the back surface polarizer 15 from absorbing polarized light emitted from the optical sheet 5 and incident on the back surface of the liquid crystal panel 3, with the result of high efficiency for light utilization. Since light emitted from the polarized-light separating element 12 is linearly polarized in the direction of the polarized-light transmission axis of the polarized-light separating element 12, the back surface polarizer 15 may be omitted. The liquid crystal panel 3 may alternatively be in contact with the optical sheet 5.

(Arrangement of Optical Sheet)

Figure 2:
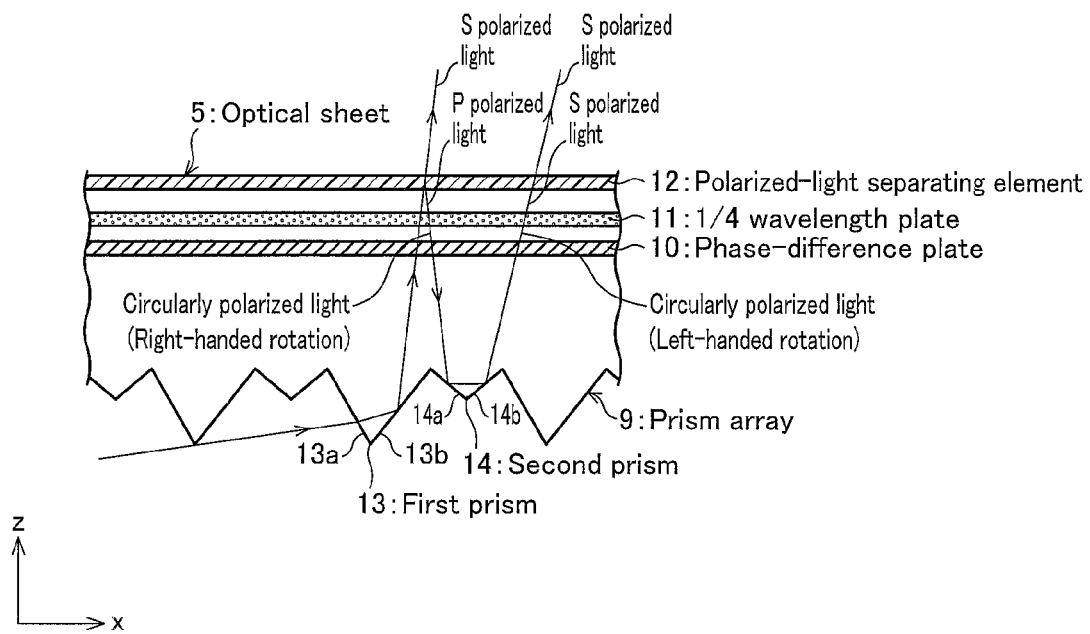
FIG. 2 is an enlarged cross-sectional view of a portion of an optical sheet.
Figure 2:
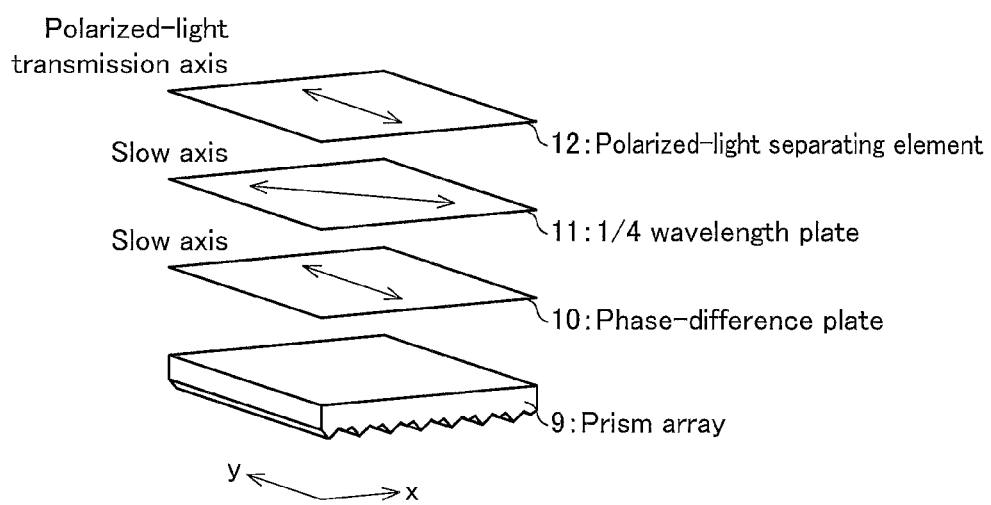

FIG. 2 is an enlarged cross-sectional view of a portion of the optical sheet 5. FIG. 2 further illustrates respective optical axes of the individual layers. FIG. 2 shows arrows to indicate an example optical path of light emitted from the light guide plate 8 and incident on the optical sheet 5.

The optical sheet 5 includes (i) a prism array 9 on its back surface side, (ii) a phase-difference plate (second phase-difference plate) 10 on a front surface side of the prism array 9, (iii) a ¼ wavelength plate (first phase-difference plate) 11 on a front surface side of the phase-difference plate 10, and (iv) a polarized-light separating element 12 on a front surface side of the ¼ wavelength plate 11.

The prism array 9 includes a plurality of first prisms 13 and a plurality of second prisms 14. The first prisms 13 and the second prisms 14 are provided alternately along the direction (x direction) extending away from the light source 6. The prism array 9 has a shape that is uniform along the direction (y direction) in which the first prisms 13 extend.

The first prisms 13 each have a first surface 13a inclined on the side of the light source 6 and a second surface 13b inclined on the opposite side in symmetry to the first surface 13a. The first surface 13a and the second surface 13b have an equal angle to the y-z plane, and are symmetrical to each other with respect to the y-z plane. The first prisms 13 thus each have a cross section in the shape of an isosceles triangle. The first prisms 13 are taller than the second prisms 14, and protrude toward the light guide plate 8 farther than the second prisms 14.

The second prisms 14 each have a third surface 14a inclined on the side of the light source 6 and a fourth surface 14b inclined on the opposite side in symmetry to the third surface 14a. The third surface 14a and the fourth surface 14b have an equal angle to the y-z plane, and are symmetrical to each other with respect to the y-z plane. The second prisms 14 thus each have a cross section in the shape of an isosceles triangle. The second prisms 14 each have a vertex angle larger than that of each first prism 13. The second prisms 14 each have a vertex angle larger than that of each first prism 13 so that the two surfaces of each second prism 14 (that is, the third surface 14a and the fourth surface 14b) totally reflect light reflected by the polarized-light separating element 12.

The phase-difference plate 10 imparts a predetermined phase difference to light having a wavelength λ and passing through the phase-difference plate 10 in its thickness direction. A later description will deal in detail with the size of the phase difference that the phase-difference plate 10 imparts. The phase-difference plate 10 has a slow axis along the y direction.

The ¼ wavelength plate 11 imparts a phase difference of a ¼ wavelength (λ/4) to light having the wavelength λ and passing through the ¼ wavelength plate 11 in its thickness direction. The ¼ wavelength plate 11 has a slow axis at an angle of 45 degrees with respect to the x direction.

Light passes through the phase-difference plate 10 and the ¼ wavelength plate 11 at an angle that is not exactly parallel to the thickness direction but that is inclined several degrees (for example, smaller than 10 degrees) with respect to the thickness direction. The light, however, travels in a direction that is substantially parallel to the thickness direction. The phase difference imparted to the passing light can thus be regarded as substantially equal to that which would be imparted to light passing through the phase-difference plate 10 and the ¼ wavelength plate 11 in a direction exactly parallel to the thickness direction (that is, perpendicular to the layers).

The polarized-light separating element 12 transmits only light polarized in a certain direction, and reflects light polarized in a direction perpendicular to that certain direction. The polarized-light separating element 12 may be, for example, a DBEF (registered trademark). The polarized-light separating element 12 has a polarized-light transmission axis (that is, the direction of polarization of light that the polarized-light separating element 12 transmits) angled at 90 degrees with respect to the x direction.

The prism array 9, the phase-difference plate 10, the ¼ wavelength plate 11, and the polarized-light separating element 12 are integrated with each other to form the optical sheet 5. The phase-difference plate 10, the ¼ wavelength plate 11, and the polarized-light separating element 12 may be in contact with each other or separated from each other. In a case where the phase-difference plate 10, the ¼ wavelength plate 11, and the polarized-light separating element 12 are separated from each other, the phase-difference plate 10, the ¼ wavelength plate 11, and the polarized-light separating element 12 are preferably separated from each other by a space filled with either a material of the prism array 9 or a material (adhesive) having a refractive index close to those of materials of the individual layers. This arrangement can reduce reflectance at each interface between the individual layers (namely, the phase-difference plate 10, the ¼ wavelength plate 11, and the polarized-light separating element 12), with the result of increased efficiency for light utilization.

The above arrangement can reduce reflectance at the interface of the polarized-light separating element 12 for only light polarized in a direction parallel to the polarized-light transmission axis (that is, the direction of polarization of light that the polarized-light separating element 12 transmits): The polarized-light separating element 12 has high reflectance at the interface for light polarized in a direction perpendicular to the polarized-light transmission axis (that is, the direction of polarization of light that the polarized-light separating element 12 does not transmit).

(How Optical Sheet Polarizes Light)

With reference to FIGS. 1 and 2, the description below deals with how light having entered the optical sheet 5 behaves. FIG. 2 illustrates polarization states at different positions. The description below uses the term "right-handed rotation" for a rotation direction of circularly polarized light to refer to a clockwise direction with respect to the direction in which the light travels.

Light is emitted from the emission surface of the light guide plate 8 in an unpolarized state at an angle close to the x direction. The light emitted from the emission surface of the light guide plate 8 thus strikes the first surface 13a of each first prism 13, which protrudes toward the light guide plate 8.

The light incident on the first surface 13a of each first prism 13 is refracted by the first surface 13a and is then reflected (total reflection) by the second surface 13b. This arrangement causes light having entered the optical sheet 5 to change its direction to a direction close to the direction (z direction) perpendicular to the emission surface of the optical sheet 5. The present embodiment adjusts, for example, the direction in which light is emitted from the light guide plate 8 and the angle of each first prism 13 so that light reflected by the second surface 13b travels in a direction that is not exactly parallel to the z direction but is slightly inclined from the z direction toward the x direction. If light reflected by the second surface 13b travels in a direction exactly parallel to the z direction, polarized light reflected by the polarized-light separating element 12 will unfortunately travel back along the same optical path to be emitted from the first surface 13a.

The light reflected by the second surface 13b passes through the phase-difference plate 10 and the ¼ wavelength plate 11. The light reflected by the second surface 13b is in an unpolarized state. The polarization state of that light is thus not changed by the phase-difference plate 10 or the ¼ wavelength plate 11, with the result that the light remains unpolarized even after passing through the ¼ wavelength plate 11.

The light having passed through the ¼ wavelength plate 11 and then reached the polarized-light separating element 12 is separated into two portions: polarized light passing through the polarized-light separating element 12 and polarized light reflected by the polarized-light separating element 12. In the present embodiment, the polarized-light transmission axis extends along the y direction. The polarized-light separating element 12 thus (i) transmits light (S polarized light) polarized in the direction (y direction) perpendicular to the x-z plane and (ii) reflects light (P polarized light) polarized in the direction parallel to the x-z plane (plane of incidence). The light reflected by the polarized-light separating element 12 is thus linearly polarized light of P polarized light. The polarized-light separating element 12 reflects P polarized light so that the P polarized light travels back toward the third surface 14a of each second prism 14. The S polarized light having passed through the polarized-light separating element 12 is emitted from the emission surface of the optical sheet 25 toward the liquid crystal panel 3.

The light reflected by the polarized-light separating element 12 enters the ¼ wavelength plate 11 at an angle substantially perpendicular to the ¼ wavelength plate 11 (that is, an angle close to a −z direction). The linearly polarized light (P polarized light) passes through the ¼ wavelength plate 11, which has a slow axis angled at 45 degrees with respect to the y direction, to change into circularly polarized light.

Next, circularly polarized light having passed through the ¼ wavelength plate 11 passes through the phase-difference plate 10. The circularly polarized light is then totally reflected by the third surface 14a of each second prism 14, and is thereafter totally reflected by the fourth surface 14b to subsequently pass through the phase-difference plate 10 again. This means that circularly polarized light having passed through the ¼ wavelength plate 11 is subjected to (i) two phase difference changes caused by the phase-difference plate 10 and (ii) two other phase difference changes caused by total reflection, before returning to the ¼ wavelength plate 11 again. In the present embodiment, the phase-difference plate 10 is arranged to impart a phase difference that causes circularly polarized light to have circular polarization in an opposite rotation direction (left-handed or right-handed rotation) when returning to the ¼ wavelength plate 11 again. In other words, the present embodiment is arranged such that the phase-difference plate 10 and the second prisms 14 impart a phase difference of λ/2 (that is, a phase shift amount π) in total to the circularly polarized light, having passed through the ¼ wavelength plate 11 toward the second prisms 14, before the circularly polarized light returns to the ¼ wavelength plate 11 again.

The description below deals with how polarized light is changed by total reflection. Assuming that light travels through a medium having a high refractive index (in the present embodiment, the second prisms 14 having a refractive index n1) toward a boundary between that medium and a medium having a low refractive index (in the present embodiment, air having a refractive index n2), the light is not refracted but all reflected in a case where the light is incident on the boundary at the critical angle θc or larger. This phenomenon is called total reflection.

$$\sin \theta c = n2/n1 < 1$$

Strictly speaking, however, a boundary surface at which total reflection occurs lets an evanescent wave leak out to the medium having a low refractive index. Such an evanescent wave, after passing through the boundary surface, attenuates extremely sharply. The evanescent wave causes, at the boundary surface, a phase shift (phase lead) between light on the path of incident light and that on the path of reflected light. This phase shift is called Goos-Hanchen shift.

This phase lead differs between P polarized light and S polarized light. Total reflection causes (i) P polarized light to have a phase lead δp and (ii) S polarized light to have a phase lead δs. The phase leads δp and δs may be calculated with the following expressions:

$$\tan\frac{\delta_p}{2} = \frac{n_1}{n_2}\frac{\sqrt{\left(\frac{n_1}{n_2}\right)^2 \sin^2\theta_1 - 1}}{\cos\theta_1}$$ [Math. 1]

$$\tan\frac{\delta_s}{2} = \frac{n_2}{n_1}\frac{\sqrt{\left(\frac{n_1}{n_2}\right)^2 \sin^2\theta_1 - 1}}{\cos\theta_1}$$

where n1 represents the refractive index of a medium having a high refractive index, n2 represents the refractive index of a medium having a low refractive index, and θ1 represents the angle of incidence (that is, the angle between the optical path of light incident on a boundary surface and the direction perpendicular to the boundary surface).

Figure 3:
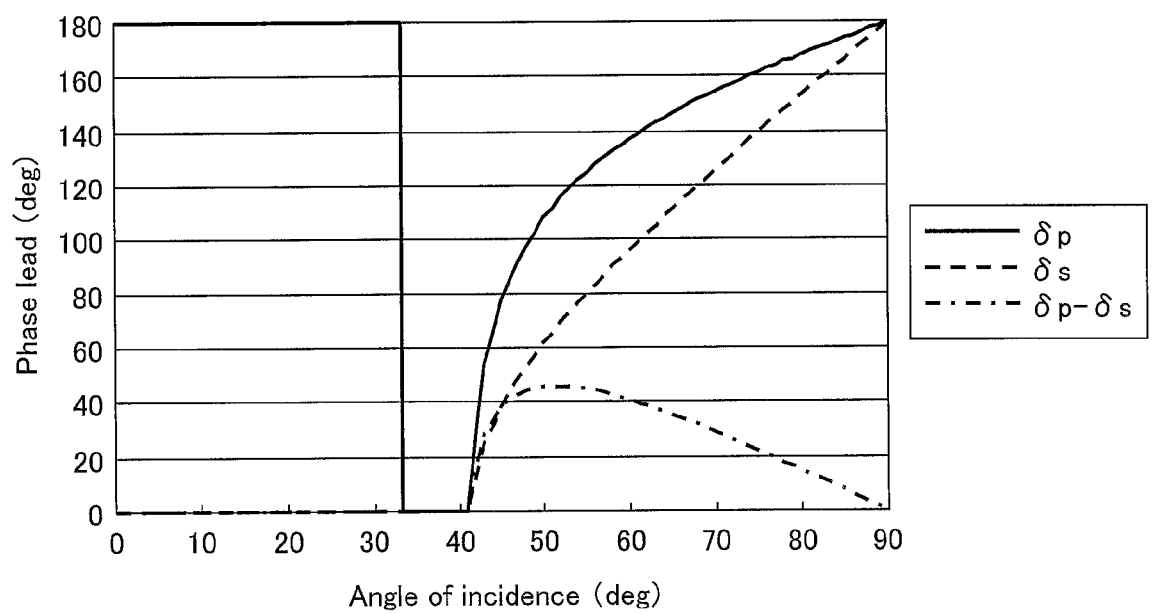
FIG. 3 is a graph illustrating example phase delays caused by total reflection.

FIG. 3 is a graph illustrating example phase leads caused by total reflection. FIG. 3 shows a phase lead δp caused by total reflection in P polarized light, a phase lead δs caused by total reflection in S polarized light, and a phase difference δp−δs between the P polarized light and the S polarized light. The present embodiment assumes that n1=1.511 and n2=1, which means that the critical angle θc=41.438 degrees. While the angle of incidence is not smaller than the critical angle θc (at and over which total reflection occurs), the phase difference δp−δs between the P polarized light and the S polarized light has a value within the range of 0 to 45 degrees (0 to π/4). In other words, a single instance of total reflection causes a phase difference within the range of 0 to π/4 between P polarized light and S polarized light. The two instances of total reflection at the third surface 14a and fourth surface 14b of each second prism 14 thus cause a phase difference within the range of 0 to π/2 between P polarized light and S polarized light. Since δp>δs, the phase of P polarized light leads that of S polarized light, meaning that the phase of S polarized light is delayed relatively with respect to that of P polarized light. In FIG. 2, the slow axis for total reflection corresponds to the y direction (that is, the direction in which the prisms extend).

Imparting a phase difference to light having a polarized state means changing the polarization state of that light. The present embodiment, to correct a phase shift caused by two instances of total reflection, includes a phase-difference plate 10 on a back surface side of the ¼ wavelength plate 11. The phase-difference plate 10, however, does not have a phase difference that cancels phase leads by total reflection: The phase-difference plate 10 has a phase difference such that undergoing two instances of total reflection and two instances of passing through the phase-difference plate 10 results in a total phase difference (delay of S polarized light) of λ/2 (phase delay π). For instance, in a case where a single instance of total reflection causes a phase difference (delay of S polarized light) of λ/12 (phase delay of 30 degrees), the phase-difference plate 10 is preferably arranged to impart a phase difference of λ/6 (phase delay of 60 degrees) to light each time the light passes through the phase-difference plate 10. The phase-difference plate 10 is arranged to have a slow axis parallel to the direction in which the second prisms 14 of the prism array 9 extend.

In a case where second prisms each have a refractive index of 1.511 as in the present embodiment, the phase difference δp−δs resulting from total reflection has a value within the range of 0 to λ/8 (0 to 45 degrees) as illustrated in FIG. 3. In view of such a phase difference lead of FIG. 3 caused by total reflection, the phase-difference plate 10 has a phase difference of not less than λ/4 and not greater than λ/8 (that is, from 90 degrees to 45 degrees).

Further, in a case where, for instance, the phase difference resulting from total reflection is λ/8 (45 degrees), that is, the angle of incidence in FIG. 3 is 50 degrees or in the vicinity thereof, the phase-difference plate 10 may alternatively have a phase difference of not greater than λ/6 (60 degrees) and not less than λ/12 (30 degrees). In a case where the phase-difference plate 10 has a phase difference of λ/6 (60 degrees), two instances of passing through the phase-difference plate 10 (phase difference of 60 degrees) and two instances of total reflection (phase difference of 45 degrees) result in a total phase difference of 210 degrees. This means that in this case, there is a difference of 30 degrees from a phase difference of 180 degrees, which is necessary for conversion of circularly polarized light into circularly polarized light having an opposite rotation. In a case where the phase-difference plate 10 has a phase difference of λ/12 (30 degrees), two instances of passing through the phase-difference plate 10 (phase difference of 30 degrees) and two instances of total reflection (phase difference of 45 degrees) result in a total phase difference of 150 degrees. This means that in this case also, there is a difference of 30 degrees from a phase difference of 180 degrees, which is necessary for conversion of circularly polarized light into circularly polarized light having an opposite rotation. Thus, regardless of whether the phase-difference plate 10 has a phase difference of λ/6 (60 degrees) or λ/12 (30 degrees), the same proportion of light passes through the polarized-light separating element 12 again. With a difference of 30 degrees or in the vicinity thereof from the ideal phase difference of 180 degrees, a large proportion of light passes through the phase-difference plate 10 again (that is, a large proportion of light is reusable).

As the above discussion indicates, the phase-difference plate 10 has a phase difference of not greater than λ/4 and not less than λ/12. The phase-difference plate 10 may alternatively have a phase difference of not greater than λ/6 and not less than λ/12.

It is needless to say that two instances of passing through the phase-difference plate 10 and two instances of total reflection may result in a total phase difference of λ/2+mλ (where m is an integer) instead of exactly λ/2 (180 degrees) and that the ¼ wavelength plate 11 may have a phase difference of λ/4+mλ (where m is an integer) instead of exactly λ/4 (90 degrees).

Circularly polarized light having passed through the ¼ wavelength plate 11 toward the second prisms 14 passes through the phase-difference plate 10 and is then totally reflected once by the third surface 14a of each second prism 14, at which time point the circularly polarized light becomes subjected to a phase shift of π/2. Specifically, the light is totally reflected once by the third surface 14a to become linearly polarized light having a polarization direction inclined at an angle of 45 degrees with respect to the polarization direction of P polarized light (that is, linearly polarized light having a P polarized light component and an S polarized light component that are identical to each other or linearly polarized light having a polarization direction inclined at an angle of 45 degrees with respect to the x-z plane). Next, the light is totally reflected once again by the fourth surface 14b of each second prism 14, and then passes through the phase-difference plate 10 again to be subjected to another phase shift of π/2. The light, after passing through the phase-difference plate 10 toward the polarized-light separating element 12, includes a P polarized light component having a phase lead of π. The light, which has passed through the phase-difference plate 10 toward the polarized-light separating element 12, is circularly polarized light having a rotation direction opposite to that of the original circularly polarized light (at the time point at which the light passed through the phase-difference plate 10 toward the second prisms 14).

The light is elliptically polarized between the phase-difference plate 10 and the second prisms 14.

The circularly polarized light having passed through the phase-difference plate 10 toward the polarized-light separating element 12 passes through the ¼ wavelength plate 11 for conversion into linearly polarized light. Since the circularly polarized light had a reversed rotation direction, the linearly polarized light exiting the ¼ wavelength plate 11 has a polarization direction perpendicular to that of the linearly polarized light (P polarized light) at the time of the reflection by the polarized-light separating element 12. The linearly polarized light exiting the ¼ wavelength plate 11 is, in other words, linearly polarized light of S polarized light.

Since the light having been reflected by the second prisms 14 and then passed through the ¼ wavelength plate 11 is S polarized light, it can pass through the polarized-light separating element 12. The S polarized light having passed through the polarized-light separating element 12 is emitted from the emission surface of the optical sheet 5 to strike the liquid crystal panel 3.

As the result of the process described above, only S polarized light is emitted from the emission surface of the optical sheet 5 (that is, the surface facing the liquid crystal panel 3). Further, P polarized light having been reflected by the polarized-light separating element 12 to travel back toward the second prisms 14 is converted into S polarized light by the polarized light converting elements (namely, the ¼ wavelength plate 11, the phase-difference plate 10, and the second prisms 14) to be emitted from the optical sheet 5. The optical sheet 5 consequently makes it possible to (i) highly efficiently utilize light that is incident from the light-emitting section 4 on the optical sheet 5 and to (ii) emit only S polarized light at an angle close to 90 degrees with respect to the emission surface.

The present embodiment stacks up all of the prism array 9, the polarized-light separating element 12, and the polarized light converting elements (namely, the ¼ wavelength plate 11 and the phase-difference plate 10) to integrally form an optical sheet 5. This arrangement eliminates the need for alignment of the individual optical members, and facilitates assembly of the liquid crystal display device 1, thereby reducing the cost of producing the liquid crystal display device 1. Further, the above arrangement, which allows the individual optical members to integrally form an optical sheet 5, allows production of an optical sheet 5 that is large-sized for use in a large screen yet reduced in thickness. This in turn allows production of a thin liquid crystal display device 1.

Further, the present embodiment is arranged such that the individual optical members (namely, the polarized-light separating element 12, the ¼ wavelength plate 11, and the phase-difference plate 10) are in contact with each other or that the individual optical members are separated from each other by a material having a refractive index equivalent or close to those of the individual optical members. This arrangement allows the optical sheet 5 to cause only a small refractive index change inside itself as compared at least to a conventional technique involving different optical members separated from each other by air or the like. With the above arrangement, polarized light reflected by the polarized-light separating element 12 (P polarized light) is converted through the optical sheet 5, which causes only a small refractive index change, into light that is polarized so as to be able to pass through the polarized-light separating element 12. The above arrangement can thus almost completely eliminate a light loss caused by Fresnel reflection at the interface between the individual optical members, thereby improving efficiency for light utilization.

(Light Utilization Efficiency Simulation)

Figure 4:
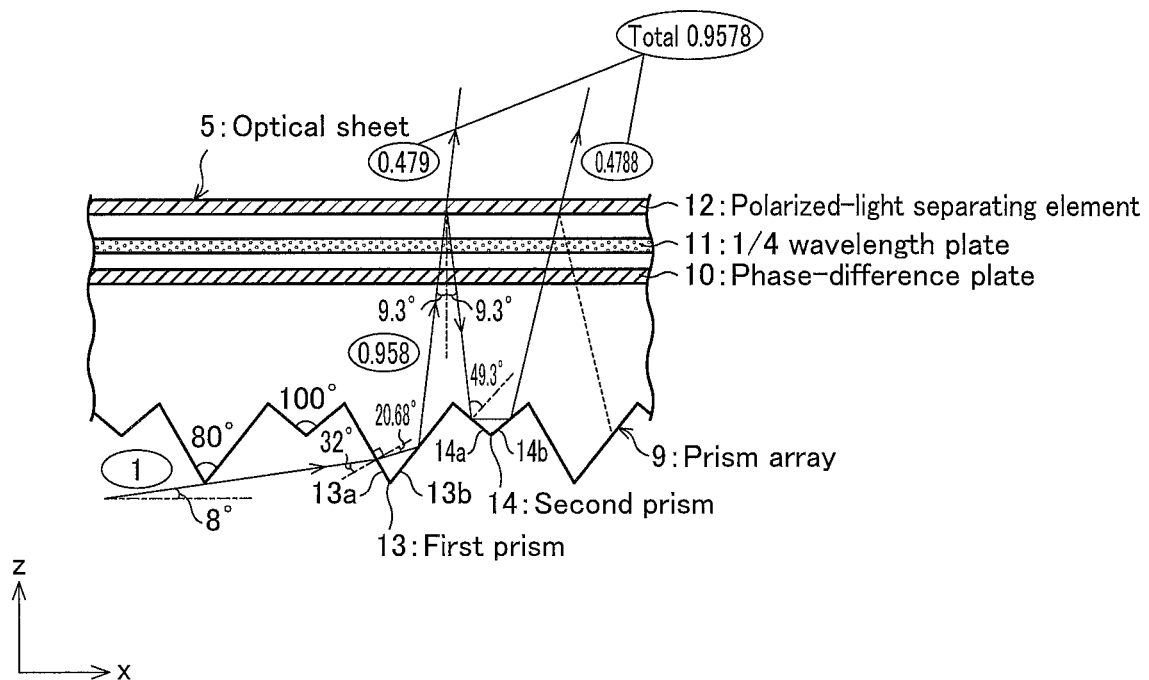
FIG. 4 is a diagram illustrating a cross section of the optical sheet and light intensities at different positions.

The efficiency for light utilization was calculated of the optical sheet 5 of the present embodiment with use of an optical simulator. FIG. 4 is a diagram illustrating a cross section of the optical sheet 5 and light intensities at different positions.

The simulation was run under the following conditions: Light was emitted from the outside (that is, from the light-emitting section 4) to strike the first prisms 13 of the optical sheet 5 at an angle that was parallel to the x-z plane and that was 8 degrees with respect to the emission surface of the optical sheet 5 (horizontal direction). The light emitted had a wavelength of 550 nm. The first prisms 13 each had a cross section in the shape of an isosceles triangle of which the vertex angle was 80 degrees. The second prisms 14 each had a cross section in the shape of an isosceles triangle of which the vertex angle was 100 degrees. The polarized-light separating element 12, the ¼ wavelength plate 11, and the phase-difference plate 10 each had its optical axis extending in the direction illustrated in FIG. 2. Specifically, the polarized-light separating element 12 had a polarized-light transmission axis extending in a direction perpendicular to the x direction. The ¼ wavelength plate 11 had a slow axis extending in a direction angled at 45 degrees with respect to the x direction. The phase-difference plate 10 had a slow axis extending in a direction perpendicular to the x direction. The phase-difference plate 10 had a phase difference (retardation) of ⅛ wavelength along its thickness direction. The optical sheet 5 (specifically, the prism array 9) had a refractive index of 1.5, whereas outside air had a refractive index of 1. The light used in the simulation had a single wavelength. The simulation was run under an ideal condition: The polarized-light separating element 12 would cause an absorption loss of 0%. The polarized-light separating element 12 had a transmittance of 100% for light polarized in a direction parallel to the polarized-light transmission axis, and had a reflectance of 100% for light polarized in a direction perpendicular to the polarized-light transmission axis.

The description below first deals with a preferable phase difference for the phase-difference plate 10. Light enters each first prism 13 of the optical sheet 5 at an angle of 32 degrees with respect to a direction perpendicular to the first surface 13a. The light having entered the first prism 13 travels at an angle of 20.68 degrees with respect to the direction perpendicular to the first surface 13a by Snell's law. Next, the light is reflected (total reflection) by the second surface 13b of each first prism 13 to strike the polarized-light separating element 12. The light strikes the polarized-light separating element 12 at an angle of 9.3 degrees with respect to a direction perpendicular to the boundary surface of the polarized-light separating element 12. Polarized light reflected by the polarized-light separating element 12 travels in a direction angled at 9.3 degrees toward the x direction from the direction (z direction) perpendicular to the boundary surface of the polarized-light separating element 12, and reaches the third surface 14a of each second prism 14. The light strikes the third surface 14a at an angle of 49.3 degrees with respect to a direction perpendicular to the third surface 14a of the second prism 14, and is thus totally reflected by the third surface 14a. This instance of total reflection causes a phase difference change of approximately 44.55 degrees as calculated with reference to FIG. 3. This indicates that in the case illustrated in FIG. 4, using a phase-difference plate 10 having a phase difference of approximately λ/8 (45 degrees) along its thickness direction allows P polarized light reflected by the polarized-light separating element 12 to be mostly converted into S polarized light.

The description below now deals with the intensity of light emitted from the optical sheet 5 under the above conditions. The description below assumes that light reaching the optical sheet 5 from the outside has an intensity of 1. First, light striking each first prism 13 from the outside is partly reflected by a surface of the first prism 13 (that is, the first surface 13a) as a result of Fresnel reflection. The light having been refracted at the surface and entered the first prism 13 has an intensity of 0.958. The light then passes through the optical sheet 5 to reach the polarized-light separating element 12. Then, half of the light (with an intensity of 0.479) passes through the polarized-light separating element 12 in the form of S polarized light to be emitted from the emission surface of the optical sheet 5. The remaining half of the light (with an intensity of 0.479) is P polarized light, and is thus reflected by the polarized-light separating element 12 to travel back toward the ¼ wavelength plate 11.

The P polarized light reflected by the polarized-light separating element 12 passes through the ¼ wavelength plate 11 and the phase-difference plate 10, and is then totally reflected (by the second prisms 14) to change its polarization state. Most of the P polarized light is converted into S polarized light. The light reaching the polarized-light separating element 12 again includes S polarized light having an intensity of 0.4788 and P polarized light having an intensity of 0.0002. The light having the intensity of 0.4788 (S polarized light) passes through the polarized-light separating element 12, whereas the remaining light having the intensity of 0.0002 (P polarized light) is reflected by the polarized-light separating element 12 again to travel back toward the ¼ wavelength plate 11.

The component exiting the optical sheet 5 when the light first reaches the polarized-light separating element 12 has an intensity of 0.479, whereas the component exiting the optical sheet 5 when the light subsequently reaches the polarized-light separating element 12 has an intensity of 0.4788, the sum of the two intensities being 0.9578. This is a value with no consideration into Fresnel reflection of light from the polarized-light separating element 12 toward the outside (air). The light emitted from the optical sheet 5 thus has an actual intensity of 0.9158. The optical sheet 5, therefore, makes it possible to utilize approximately 91.6% of emitted light in the form of linearly polarized light that is polarized in a predetermined direction.

Light emitted from the optical sheet 5 of the present embodiment is already linearly polarized. This ideally causes no absorption loss at the back surface polarizer 15 of the liquid crystal panel 3.

In contrast, in a case where a conventional backlight including no polarized-light separating element emits light onto a liquid crystal panel, since such light from a conventional backlight is in an unpolarized state, half of the light is absorbed by a back surface polarizer of the liquid crystal panel, and only the remaining half is utilized for display. In other words, of light from a conventional backlight, only a component having an intensity of 0.5 is utilized.

The optical sheet 5 of the present embodiment makes it possible to utilize a light component having an intensity of 0.9158 for display. This means that the liquid crystal display device 1 of the present embodiment has an improved light utilization efficiency that is 1.83 times that of a liquid crystal display device including a conventional backlight. The liquid crystal display device 1 of the present embodiment, in other words, has a reduced backlight power consumption that is 0.546 times that of a liquid crystal display device including a conventional backlight.

[Embodiment 2]

Another embodiment of the present invention is described below. For convenience of explanation, members and arrangements of the present embodiment that are identical in function to those described for Embodiment 1 with reference to drawings are each assigned a common reference numeral, and are not described here in detail. The present embodiment differs from Embodiment 1 in how the optical sheet is arranged.

Figure 5:
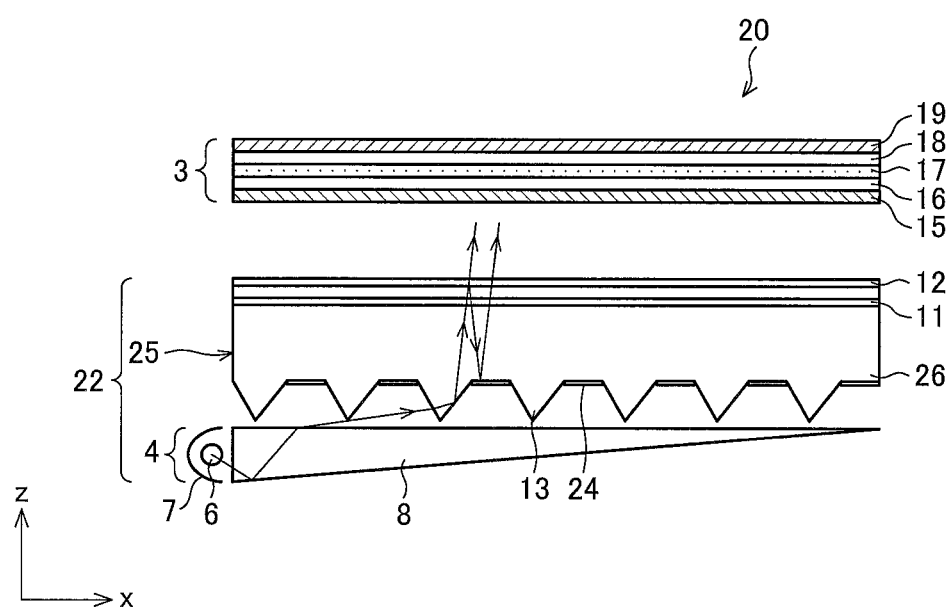
FIG. 5 is a cross-sectional view illustrating a configuration of a liquid crystal display device of another embodiment of the present invention.

FIG. 5 is a cross-sectional view illustrating a configuration of a liquid crystal display device 20 of the present embodiment. FIG. 5 shows arrows to indicate an example optical path of light from a light source 6. The liquid crystal display device 20 includes a backlight 22 and a liquid crystal panel 3 provided on a front surface side of the backlight 22 (that is, in the direction of a user). The description below uses (i) the term "x direction" to refer to a direction that extends from one end of the liquid crystal display device 20 at which end the light source 6 is provided to the other end, (ii) the term "z direction" to refer to a direction that extends from a back surface of the liquid crystal display device 20 to a front surface thereof, and (iii) the term "y direction" to refer to a direction perpendicular to the x direction and the z direction. The liquid crystal panel 3 of the present embodiment is identical in arrangement to that of Embodiment 1.

The backlight 22 includes a light-emitting section 4 and an optical sheet (optical film) 25 provided on a front surface side of the light-emitting section 4. The light-emitting section 4 includes a light source 6, a reflector 7, and a light guide plate 8.

(Arrangement of Optical Sheet)

The optical sheet 25 receives unpolarized light emitted from the light guide plate 8 and incident on a back surface of the optical sheet 25, changes the unpolarized light into linearly polarized light, and emits the linearly polarized light from a front surface (emission surface) thereof toward the liquid crystal panel 3. The optical sheet 25 includes a prism array 26, a ¼ wavelength plate 11, and a polarized-light separating element 12 in that order from a back surface side of the optical sheet 25 to a front surface side thereof (that is, from a light entry side to a light emission side).

The prism array 26 is provided on the back surface side of the optical sheet 25, and includes a plurality of first prisms 13 and a plurality of light reflecting sections 24. The first prisms 13 and the light reflecting sections 24 are provided alternately along the direction (x direction) extending away from the light source 6.

Figure 6:
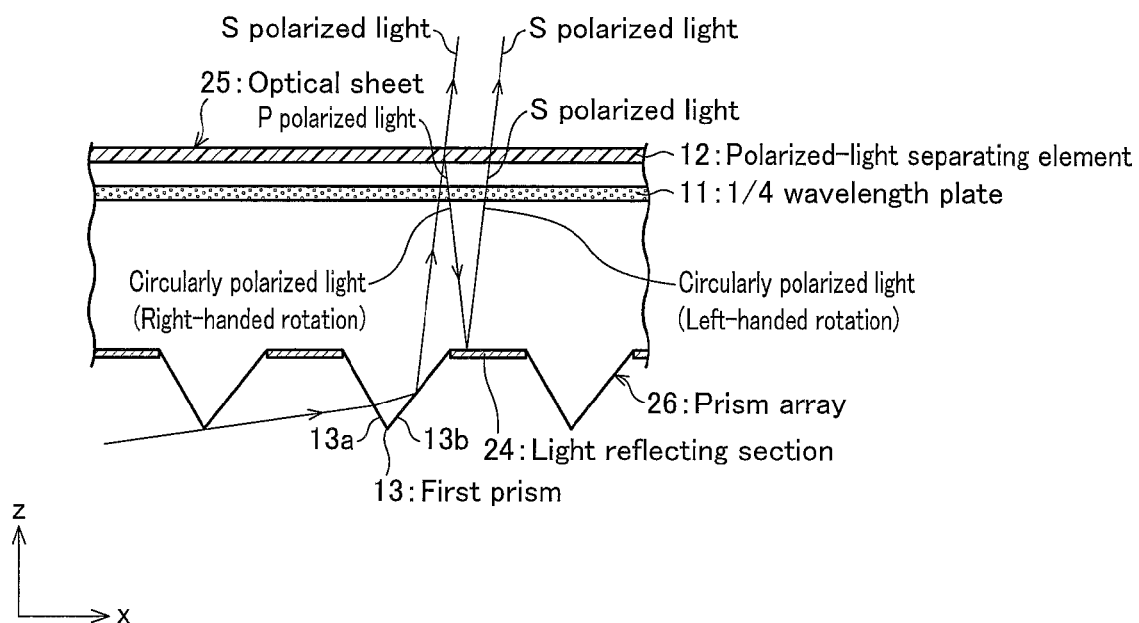
FIG. 6 is an enlarged cross-sectional view of a portion of an optical sheet.
Figure 6:
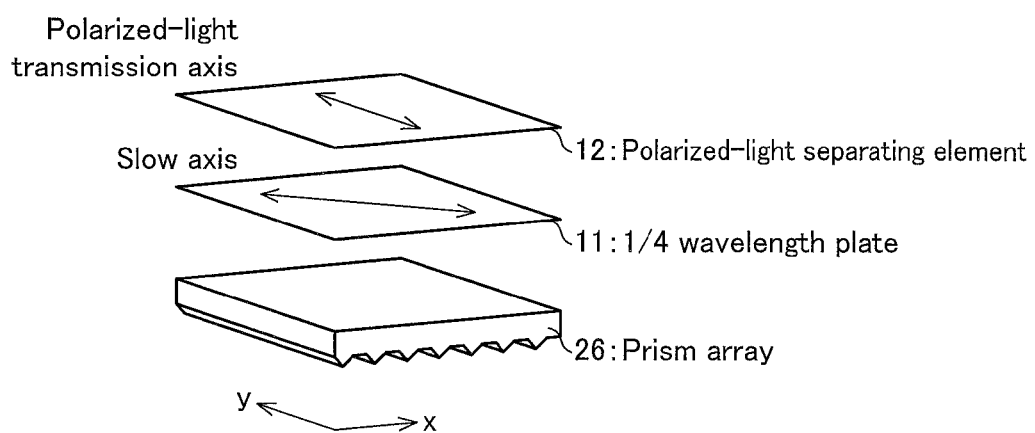

FIG. 6 is an enlarged cross-sectional view of a portion of the optical sheet 25. FIG. 6 further illustrates respective optical axes of the individual layers. FIG. 6 shows arrows to indicate an example optical path of light emitted from the light guide plate 8 and incident on the optical sheet 25.

The optical sheet 25 includes (i) a prism array 26 on its back surface side, (ii) a ¼ wavelength plate 11 on a front surface side of the prism array 26, and (iii) a polarized-light separating element 12 on a front surface side of the ¼ wavelength plate 11. The ¼ wavelength plate 11 and the polarized-light separating element 12 are similar in arrangement to those of Embodiment 1. The ¼ wavelength plate 11 has a slow axis at an angle of 45 degrees with respect to the x direction. The polarized-light separating element 12 has a polarized-light transmission axis (that is, the direction of polarization of light that the polarized-light separating element 12 transmits) angled at 90 degrees with respect to the x direction.

The prism array 26 includes a plurality of first prisms 13 and a plurality of light reflecting sections 24. The first prisms 13 and the light reflecting sections 24 are provided alternately along the direction (x direction) extending away from the light source 6. The prism array 26 has a shape that is uniform along the direction (y direction) in which the first prisms 13 extend.

The first prisms 13 each have a first surface 13a inclined on the side of the light source 6 and a second surface 13b inclined on the opposite side in symmetry to the first surface 13a. The first surface 13a and the second surface 13b have an equal angle, and are symmetrical to each other. The first prisms 13 thus each have a cross section in the shape of an isosceles triangle.

The light reflecting sections 24 each serve as a reflecting surface for reflecting light from the polarized-light separating element 12 so that the light travels back toward the polarized-light separating element 12. The reflecting surface is parallel to the emission surface of the optical sheet 25. The light reflecting sections 24 each include a metal film deposited at a surface thereof (that is, a surface on the back surface side of the optical sheet 25). The metal film can be made of a material such as silver and aluminum. In a case where the metal film is made of aluminum in particular, the light reflecting sections 24 may each further include a reflective coating between the metal film and a surface of the material of the prism to increase reflectance.

The first prisms 13 may also each have a second surface 13b provided with a metal film. In this case, the second surface 13b of each first prism 13 will have low reflectance as compared to a case where the second surface 13b causes total reflection, but the backlight 22 will have higher light utilization efficiency than a conventional backlight. Further, in the above case, there is no need to form metal films only on flat surfaces for light reflecting sections, with the result of facilitated production of the optical sheet 25.

The prism array 26, the ¼ wavelength plate 11, and the polarized-light separating element 12 are integrated with each other to form the optical sheet 25. The ¼ wavelength plate 11 and the polarized-light separating element 12 may be in contact with each other or separated from each other. In a case where the ¼ wavelength plate 11 and the polarized-light separating element 12 are separated from each other, the ¼ wavelength plate 11 and the polarized-light separating element 12 are preferably separated from each other by a space filled with either a material of the prism array 26 or a material (adhesive) having a refractive index close to those of materials of the individual layers. This arrangement can reduce reflectance at the interface between the individual layers (namely, the ¼ wavelength plate 11 and the polarized-light separating element 12), with the result of increased efficiency for light utilization. The above arrangement can reduce reflectance at the interface of the polarized-light separating element 12 for only light polarized in a direction parallel to the polarized-light transmission axis (that is, the direction of polarization of light that the polarized-light separating element 12 transmits): The polarized-light separating element 12 has high reflectance at the interface for light polarized in a direction perpendicular to the polarized-light transmission axis (that is, the direction of polarization of light that the polarized-light separating element 12 does not transmit).

(How Optical Sheet Polarizes Light)

With reference to FIGS. 5 and 6, the description below deals with how light having entered the optical sheet 25 behaves. FIG. 6 illustrates polarization states at different positions. The description below uses the term "right-handed rotation" for a rotation direction of circularly polarized light to refer to a clockwise direction with respect to the direction in which the light travels.

Light is emitted from the emission surface of the light guide plate 8 in an unpolarized state at an angle close to the x direction. The light emitted from the emission surface of the light guide plate 8 thus strikes the first surface 13a of each first prism 13, which protrudes toward the light guide plate 8.

The light incident on the first surface 13a of each first prism 13 is refracted by the first surface 13a and is then reflected (total reflection) by the second surface 13b. This arrangement causes light having entered the optical sheet 25 to change its direction to a direction close to the direction (z direction) perpendicular to the emission surface of the optical sheet 25. The present embodiment adjusts, for example, the direction in which light is emitted from the light guide plate 8 and the angle of each first prism 13 so that light reflected by the second surface 13b travels in a direction that is not exactly parallel to the z direction but is slightly inclined from the z direction toward the x direction. If light reflected by the second surface 13b travels in a direction exactly parallel to the z direction, polarized light reflected by the polarized-light separating element 12 will unfortunately travel back along the same optical path to be emitted from the first surface 13a.

The light reflected by the second surface 13b passes through the ¼ wavelength plate 11. The light reflected by the second surface 13b is in an unpolarized state. The polarization state of that light is thus not changed by the ¼ wavelength plate 11, with the result that the light remains unpolarized even after passing through the ¼ wavelength plate 11.

The light having passed through the ¼ wavelength plate 11 and then reached the polarized-light separating element 12 is separated into two portions: polarized light passing through the polarized-light separating element 12 and polarized light reflected by the polarized-light separating element 12. In the present embodiment, the polarized-light transmission axis extends along the y direction. The polarized-light separating element 12 thus (i) transmits light (S polarized light) polarized in the direction (y direction) perpendicular to the x-z plane and (ii) reflects light (P polarized light) polarized in the direction parallel to the x-z plane (plane of incidence). The light reflected by the polarized-light separating element 12 is thus linearly polarized light of P polarized light. The polarized-light separating element 12 reflects P polarized light so that the P polarized light travels back toward the light reflecting sections 24. The S polarized light having passed through the polarized-light separating element 12 is emitted from the emission surface of the optical sheet 25 toward the liquid crystal panel 3.

The light reflected by the polarized-light separating element 12 enters the ¼ wavelength plate 11 at an angle substantially perpendicular to the ¼ wavelength plate 11 (that is, an angle close to a −z direction). The linearly polarized light (P polarized light) passes through the ¼ wavelength plate 11, which has a slow axis angled at 45 degrees with respect to the y direction, to change into circularly polarized light.

Next, circularly polarized light having passed through the ¼ wavelength plate 11 is reflected by the light reflecting sections 24. The light is reflected so that one of S polarized light and P polarized light both included in the light has a phase shifted by π. The light as reflected by the reflecting surfaces (that is, the light reflecting sections 24) is consequently circularly polarized light having a rotation direction opposite to that of the circularly polarized light at the time of the entry into the optical sheet 25.

The circularly polarized light reflected by the light reflecting sections 24 passes through the ¼ wavelength plate for conversion into linearly polarized light. Since the circularly polarized light had a reversed rotation direction, the linearly polarized light exiting the ¼ wavelength plate 11 has a polarization direction perpendicular to that of the linearly polarized light (P polarized light) at the time of the reflection by the polarized-light separating element 12. The linearly polarized light exiting the ¼ wavelength plate 11 is, in other words, linearly polarized light of S polarized light.

Since the light having been reflected by the light reflecting sections 24 and then passed through the ¼ wavelength plate 11 is S polarized light, it can pass through the polarized-light separating element 12. The S polarized light having passed through the polarized-light separating element 12 is emitted from the emission surface of the optical sheet 25 to strike the liquid crystal panel 3.

As the result of the process described above, only S polarized light is emitted from the emission surface of the optical sheet 25 (that is, the surface facing the liquid crystal panel 3). Further, P polarized light having been reflected by the polarized-light separating element 12 to travel back toward the light reflecting sections 24 is converted into S polarized light by the polarized light converting elements (namely, the ¼ wavelength plate 11 and the light reflecting sections 24) to be emitted from the optical sheet 25. The optical sheet 25 consequently makes it possible to (i) highly efficiently utilize light that is incident from the light-emitting section 4 on the optical sheet 25 and to (ii) emit only S polarized light at an angle close to 90 degrees with respect to the emission surface.

The present embodiment stacks up all of the prism array 26, the polarized-light separating element 12, and the polarized light converting elements (namely, the ¼ wavelength plate 11 and the light reflecting sections 24) to integrally form an optical sheet 25. This arrangement eliminates the need for alignment of the individual optical members, and facilitates assembly of the liquid crystal display device 20, thereby reducing the cost of producing the liquid crystal display device 20. Further, the above arrangement, which allows the individual optical members to integrally form an optical sheet 25, allows production of an optical sheet 25 that is large-sized for use in a large screen yet reduced in thickness. This in turn allows production of a thin liquid crystal display device 20.

Further, the present embodiment is arranged such that the individual optical members (namely, the polarized-light separating element 12 and the ¼ wavelength plate 11) are in contact with each other or that the individual optical members are separated from each other by a material having a refractive index equivalent or close to those of the individual optical members. This arrangement allows the optical sheet 25 to cause only a small refractive index change inside itself as compared at least to a conventional technique involving different optical members separated from each other by air or the like. With the above arrangement, polarized light reflected by the polarized-light separating element 12 (P polarized light) is converted through the optical sheet 25, which causes only a small refractive index change, into light that is polarized so as to be able to pass through the polarized-light separating element 12. The above arrangement can thus almost completely eliminate a light loss caused by Fresnel reflection at the interface between the individual optical members, thereby improving efficiency for light utilization.

(Light Utilization Efficiency Simulation)

Figure 7:
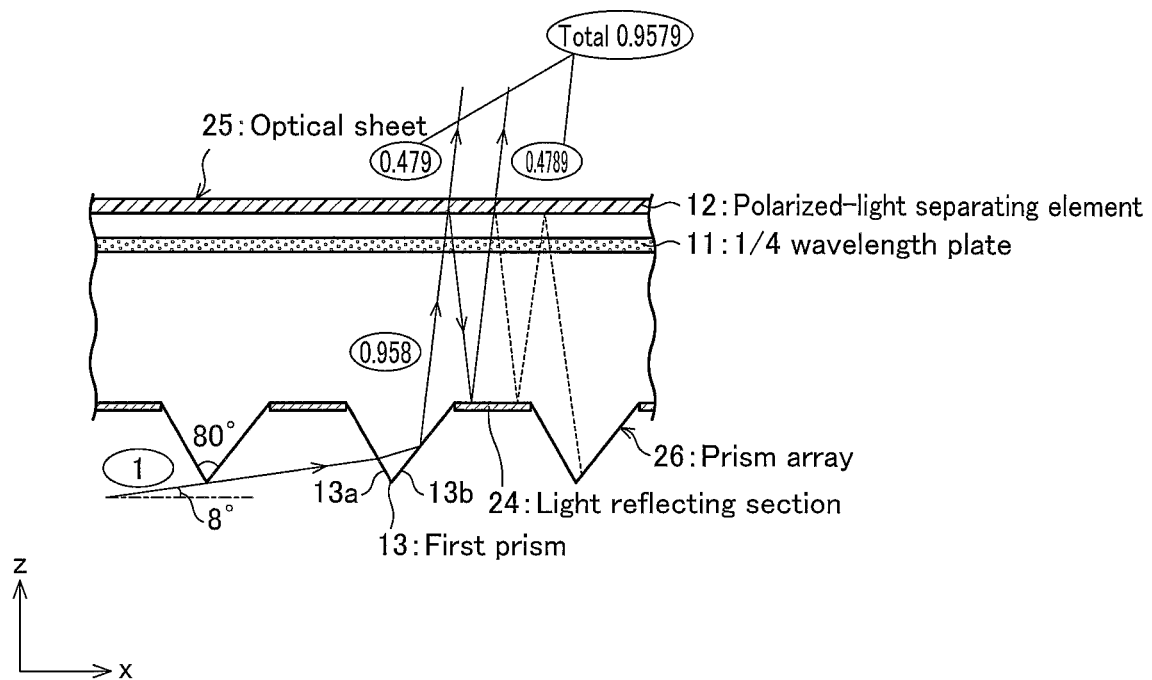
FIG. 7 is a diagram illustrating a cross section of the optical sheet and light intensities at different positions.

The efficiency for light utilization was calculated of the optical sheet 25 of the present embodiment with use of an optical simulator. FIG. 7 is a diagram illustrating a cross section of the optical sheet 25 and light intensities at different positions.

The simulation was run under the following conditions: Light was emitted from the outside (that is, from the light-emitting section 4) to strike the first prisms 13 of the optical sheet 25 at an angle that was parallel to the x-z plane and that was 8 degrees with respect to the emission surface of the optical sheet 25 (horizontal direction). The light emitted had a wavelength of 550 nm. The first prisms 13 each had a cross section in the shape of an isosceles triangle of which the vertex angle was 80 degrees. The light reflecting sections 24 each had a reflecting surface parallel to the emission surface of the optical sheet 25. The polarized-light separating element 12 and the ¼ wavelength plate 11 each had its optical axis extending in the direction illustrated in FIG. 6. Specifically, the polarized-light separating element 12 had a polarized-light transmission axis extending in a direction perpendicular to the x direction. The ¼ wavelength plate 11 had a slow axis extending in a direction angled at 45 degrees with respect to the x direction. The optical sheet 25 (specifically, the prism array 26) had a refractive index of 1.5, whereas outside air had a refractive index of 1. The light used in the simulation had a single wavelength. The simulation was run under an ideal condition: The light reflecting sections 24 each had a reflectance of 100%. The polarized-light separating element 12 would cause an absorption loss of 0%. The polarized-light separating element 12 had a transmittance of 100% for light polarized in a direction parallel to the polarized-light transmission axis, and had a reflectance of 100% for light polarized in a direction perpendicular to the polarized-light transmission axis.

The description below assumes that light reaching the optical sheet 25 from the outside has an intensity of 1. First, light striking each first prism 13 from the outside is partly reflected by a surface of the first prism 13 (that is, the first surface 13a) as a result of Fresnel reflection. The light having been refracted at the surface and entered the first prism 13 has an intensity of 0.958. The light then passes through the optical sheet 25 to reach the polarized-light separating element 12. Then, half of the light (with an intensity of 0.479) passes through the polarized-light separating element 12 in the form of S polarized light to be emitted from the emission surface of the optical sheet 25. The remaining half of the light (with an intensity of 0.479) is P polarized light, and is thus reflected by the polarized-light separating element 12 to travel back toward the ¼ wavelength plate 11.

The P polarized light reflected by the polarized-light separating element 12 passes through the ¼ wavelength plate 11, and is then reflected (by the light reflecting sections 24) to change its polarization state. Most of the P polarized light is converted into S polarized light. The light reaching the polarized-light separating element 12 again includes S polarized light having an intensity of 0.4789 and P polarized light having an intensity of 0.0001. The light having the intensity of 0.4789 (S polarized light) passes through the polarized-light separating element 12.

The component exiting the optical sheet 25 when the light first reaches the polarized-light separating element 12 has an intensity of 0.479, whereas the component exiting the optical sheet 25 when the light subsequently reaches the polarized-light separating element 12 has an intensity of 0.4789, the sum of the two intensities being 0.9579. This is a value with no consideration into Fresnel reflection of light from the polarized-light separating element 12 toward the outside (air). The light emitted from the optical sheet 25 thus has an actual intensity of 0.9163. The optical sheet 25, therefore, makes it possible to utilize approximately 91.6% of emitted light in the form of linearly polarized light that is polarized in a predetermined direction.

The optical sheet 25 of the present embodiment makes it possible to utilize a light component having an intensity of 0.916 for display. This means that the liquid crystal display device 20 of the present embodiment has an improved light utilization efficiency that is 1.83 times that of a liquid crystal display device including a conventional backlight (efficiency of 0.5). The liquid crystal display device 20 of the present embodiment, in other words, has a reduced backlight power consumption that is 0.546 times that of a liquid crystal display device including a conventional backlight.

[Variations of Embodiments 1 and 2]

Variations of Embodiments 1 and 2 of the present invention are described below. For convenience of explanation, members and arrangements of these variations that are identical in function to those described for Embodiment 1 with reference (Optical Sheet 27)

Figure 8:
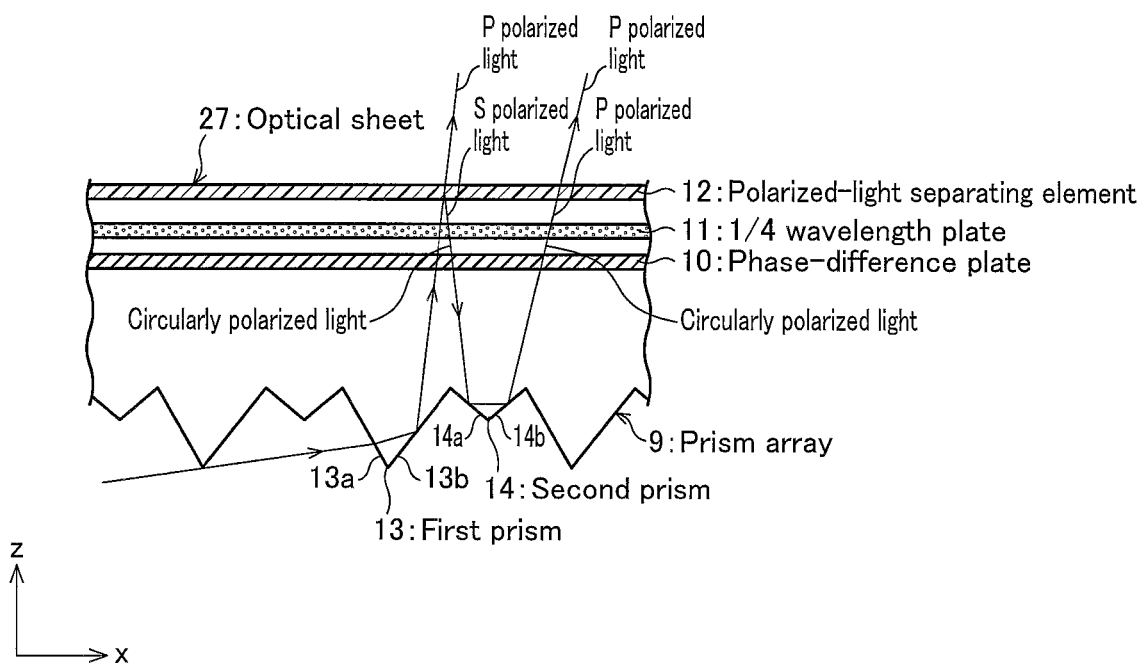
FIG. 8 is an enlarged cross-sectional view of a portion of an optical sheet of a variation.
Figure 8:
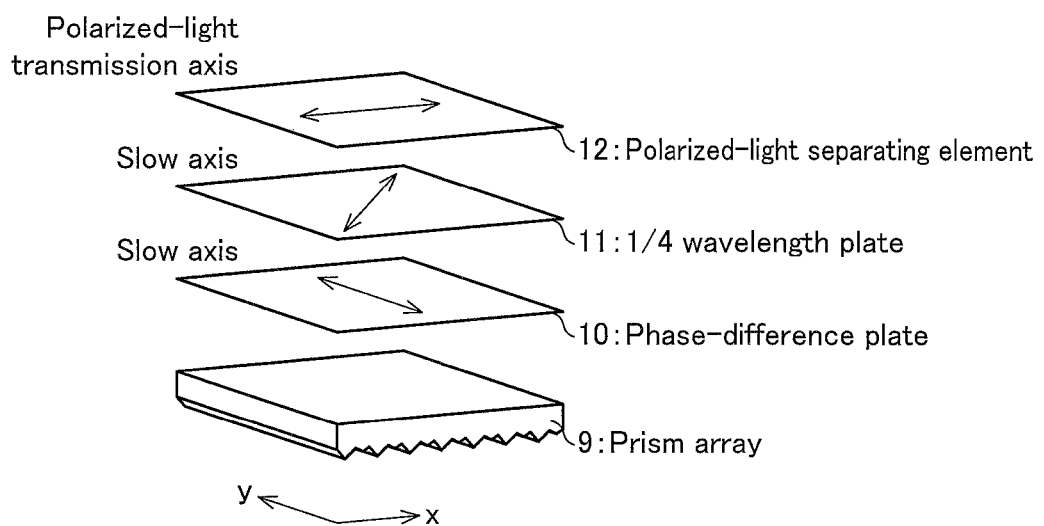

FIG. 8 is an enlarged cross-sectional view of a portion of an optical sheet 27. FIG. 8 further illustrates respective optical axes of the individual layers. FIG. 8 shows arrows to indicate an example optical path of incident light.

The optical sheet 27 differs from the optical sheet 5 of Embodiment 1 in that (i) its polarized-light separating element 12 has a polarized-light transmission axis which is different in direction from that of the polarized-light separating element 12 of the optical sheet 5 and that (ii) its ¼ wavelength plate 11 has a slow axis which is different in direction from that of the ¼ wavelength plate 11 of the optical sheet 5. Except for these points, the optical sheet 27 is identical in arrangement to the optical sheet 5 of Embodiment 1.

The optical sheet 27 is arranged such that (i) the polarized-light separating element 12 has a polarized-light transmission axis extending in the x direction, that (ii) the ¼ wavelength plate 11 has a slow axis extending in a direction angled at 45 degrees with respect to the x direction, that (iii) the phase-difference plate 10 has a slow axis extending in the y direction, and that (iv) the individual prisms extend in the y direction, that is, the prism array 9 has a shape that is uniform along the y direction.

The optical sheet 27 is arranged such that the polarized-light separating element 12 transmits P polarized light. It is thus P polarized light that is emitted from an emission surface of the optical sheet 27. S polarized light reflected by the polarized-light separating element 12 passes through the ¼ wavelength plate 11 to become circularly polarized light. The circularly polarized light then passes through the phase-difference plate 10 and is totally reflected by the second prisms 14 to become circularly polarized light having an opposite rotation. This circularly polarized light passes through the ¼ wavelength plate 11 again to be converted into P polarized light. The P polarized light exiting the ¼ wavelength plate 11 then passes through the polarized-light separating element 12 to be emitted from the emission surface of the optical sheet 27.

(Optical Sheet 28)

Figure 9:
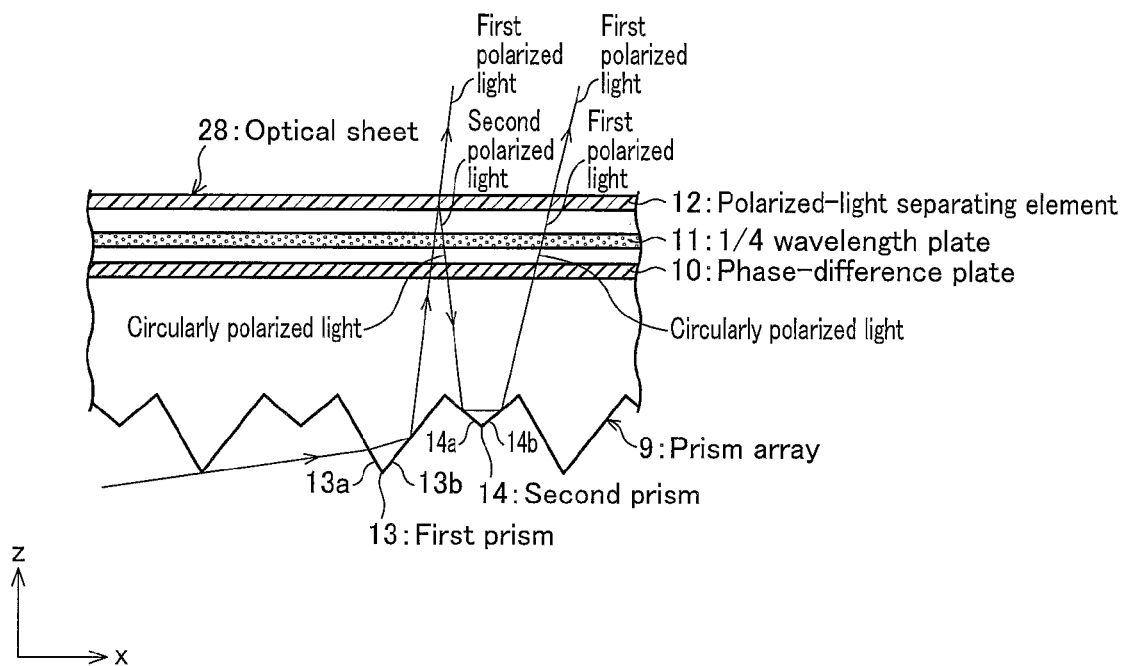
FIG. 9 is an enlarged cross-sectional view of a portion of an optical sheet of another variation.
Figure 9:
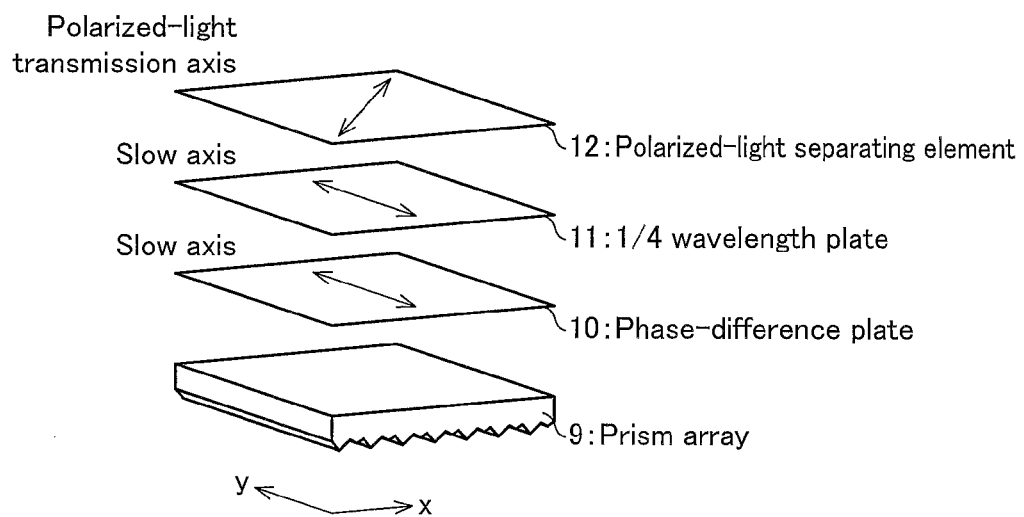

FIG. 9 is an enlarged cross-sectional view of a portion of an optical sheet 28. FIG. 9 further illustrates respective optical axes of the individual layers. FIG. 9 shows arrows to indicate an example optical path of incident light.

The optical sheet 28 differs from the optical sheet 5 of Embodiment 1 in that (i) its polarized-light separating element 12 has a polarized-light transmission axis which is different in direction from that of the polarized-light separating element 12 of the optical sheet 5 and that (ii) its ¼ wavelength plate 11 has a slow axis which is different in direction from that of the ¼ wavelength plate 11 of the optical sheet 5. Except for these points, the optical sheet 28 is identical in arrangement to the optical sheet 5 of Embodiment 1.

The optical sheet 28 is arranged such that (i) the polarized-light separating element 12 has a polarized-light transmission axis extending in a direction angled at 45 degrees with respect to the x direction, that (ii) the ¼ wavelength plate 11 has a slow axis extending in a direction angled at 90 degrees with respect to the x direction, that (iii) the phase-difference plate 10 has a slow axis extending in the y direction, and that (iv) the individual prisms extend in the y direction, that is, the prism array 9 has a shape that is uniform along the y direction.

The optical sheet 28 is arranged such that the polarized-light separating element 12 transmits linearly polarized light (herein referred to as "first linearly polarized light") having a polarization direction angled at 45 degrees in a left-handed rotation from the x direction as viewed from a front surface side (user side) of the optical sheet 28. It is thus first linearly polarized light that is emitted from an emission surface of the optical sheet 28. Linearly polarized light (herein referred to as "second linearly polarized light") having a polarization direction perpendicular to that of the first linearly polarized light is reflected by the polarized-light separating element 12. There is an angle of 45 degrees between the polarization direction of the second linearly polarized light and the slow axis of the ¼ wavelength plate 11. The second linearly polarized light reflected by the polarized-light separating element 12 thus passes through the ¼ wavelength plate 11 to become circularly polarized light. The circularly polarized light then passes through the phase-difference plate 10 and is totally reflected by the second prisms 14 to become circularly polarized light having an opposite rotation. This circularly polarized light passes through the ¼ wavelength plate 11 again to be converted into first linearly polarized light. The first linearly polarized light exiting the ¼ wavelength plate 11 passes through the polarized-light separating element 12 to be emitted from the emission surface of the optical sheet 28.

(Optical Sheet 29)

Figure 10:
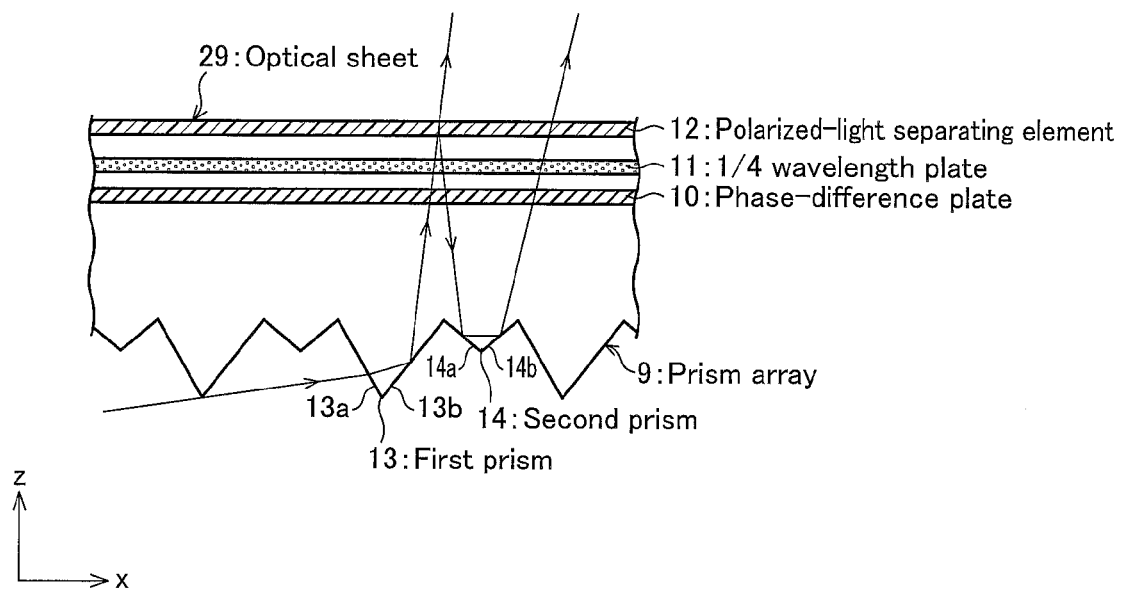
FIG. 10 is an enlarged cross-sectional view of a portion of an optical sheet of still another variation.
Figure 10:
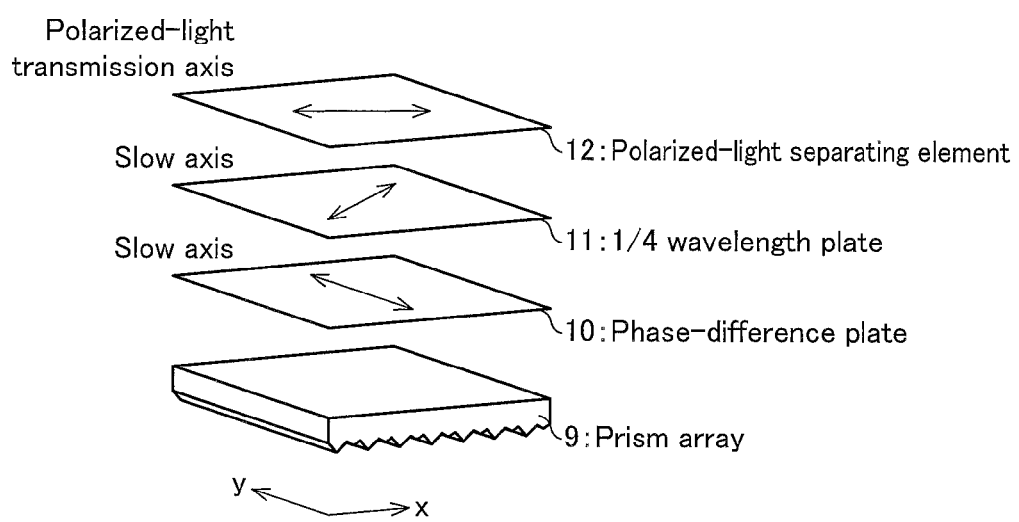

FIG. 10 is an enlarged cross-sectional view of a portion of an optical sheet 29. FIG. 10 further illustrates respective optical axes of the individual layers. FIG. 10 shows arrows to indicate an example optical path of incident light.

The optical sheet 29 differs from the optical sheet 5 of Embodiment 1 in that (i) its polarized-light separating element 12 has a polarized-light transmission axis which is different in direction from that of the polarized-light separating element 12 of the optical sheet 5 and that (ii) its ¼ wavelength plate 11 has a slow axis which is different in direction from that of the ¼ wavelength plate 11 of the optical sheet 5. Except for these points, the optical sheet 29 is identical in arrangement to the optical sheet 5 of Embodiment 1.

The optical sheet 29 is arranged such that (i) the polarized-light separating element 12 has a polarized-light transmission axis angled at 10 degrees in a right-handed rotation from the x direction as viewed from a front surface side of the optical sheet 29, that (ii) the ¼ wavelength plate 11 has a slow axis angled at 35 degrees in a left-handed rotation from the x direction as viewed from the front surface side of the optical sheet 29, that (iii) there is an angle of 45 degrees between the polarized-light transmission axis of the polarized-light separating element 12 and the slow axis of the ¼ wavelength plate 11, that (iv) the slow axis of the phase-difference plate 10 extends along the y direction, and that (v) the individual prisms extend in the y direction, that is, the prism array 9 has a shape that is uniform along the y direction.

The optical sheet 29 is arranged such that the polarized-light separating element 12 transmits linearly polarized light (herein referred to as "third linearly polarized light") having a polarization direction angled at 10 degrees in a right-handed rotation from the x direction as viewed from the front surface side of the optical sheet 29. It is thus third linearly polarized light that is emitted from an emission surface of the optical sheet 29. Linearly polarized light (herein referred to as "fourth linearly polarized light") having a polarization direction perpendicular to that of the third linearly polarized light is reflected by the polarized-light separating element 12. There is an angle of 45 degrees between the polarization direction of the fourth linearly polarized light and the slow axis of the ¼ wavelength plate 11. The second linearly polarized light reflected by the polarized-light separating element 12 thus passes through the ¼ wavelength plate 11 to become circularly polarized light. The circularly polarized light then passes through the phase-difference plate 10 and is totally reflected by the second prisms 14 to become circularly polarized light having an opposite rotation. This circularly polarized light passes through the ¼ wavelength plate 11 again to be converted into third linearly polarized light. The third linearly polarized light exiting the ¼ wavelength plate 11 passes through the polarized-light separating element 12 to be emitted from the emission surface of the optical sheet 29.

(Relationship Between Optical Axes)

Figure 11:
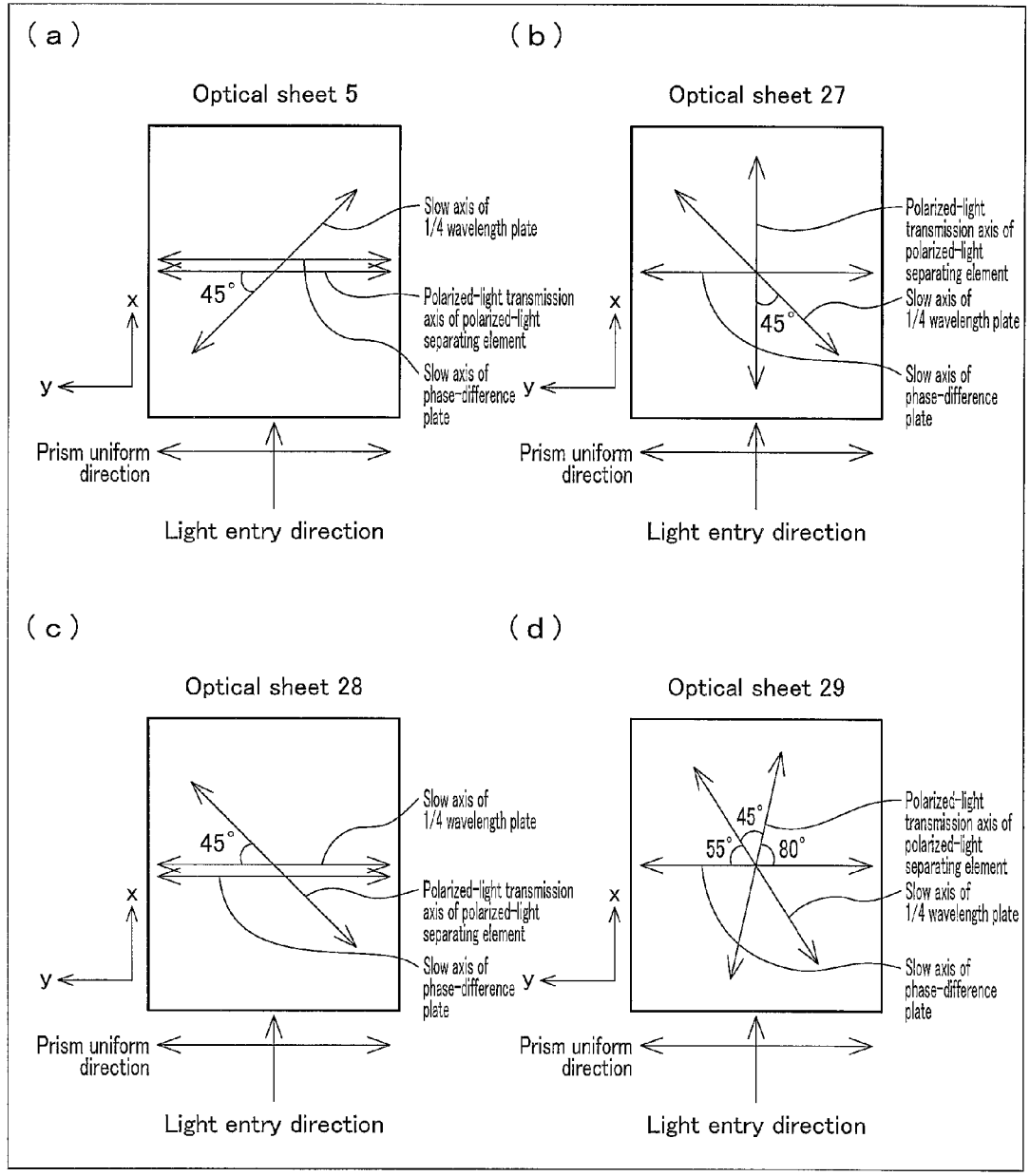
FIG. 11 shows diagrams illustrating the angle of an optical axis of each optical member of different optical sheets as viewed from a front surface side thereof.

FIG. 11 shows diagrams illustrating the angle of an optical axis of each optical member of the optical sheets 5, 27, 28, and 29 as viewed from the front surface side thereof. Specifically, (a) of FIG. 11 is a diagram illustrating the angle of an optical axis of each optical member of the optical sheet 5 illustrated in FIG. 2. (b) of FIG. 11 is a diagram illustrating the angle of an optical axis of each optical member of the optical sheet 27 illustrated in FIG. 8. (c) of FIG. 11 is a diagram illustrating the angle of an optical axis of each optical member of the optical sheet 28 illustrated in FIG. 9. (d) of FIG. 11 is a diagram illustrating the angle of an optical axis of each optical member of the optical sheet 29 illustrated in FIG. 10. The diagrams of FIG. 11 each indicate (i) the direction in which the prisms have a uniform shape (that is, the direction in which the prisms extend) and (ii) the direction in which light enters the optical sheet.

The optical sheets 5, 27, 28, and 29 are each arranged such that (1) there is an angle of 45 degrees between the polarized-light transmission axis of the polarized-light separating element 12 and the slow axis of the ¼ wavelength plate 11 and that (2) the direction in which the prisms have a uniform shape is parallel to the slow axis of the phase-difference plate 10. Satisfying these two conditions increases efficiency for light utilization.

Specifically, in a case where there is an angle of 45 degrees between the polarized-light transmission axis of the polarized-light separating element 12 and the slow axis of the ¼ wavelength plate 11, polarized light reflected by the polarized-light separating element 12 is converted by the ¼ wavelength plate 11 into circularly polarized light. In a case where there is no angle between the direction in which the prisms have a uniform shape and the slow axis of the phase-difference plate 10 (that is, the direction and the slow axis are parallel to each other), circularly polarized light incident on the phase-difference plate 10 passes through the phase-difference plate 10 and then undergoes total reflection to be converted into circularly polarized light having an opposite rotation and return to the phase-difference plate 10. The circularly polarized light having an opposite rotation passes through the ¼ wavelength plate 11 to be converted into linearly polarized light having a polarization direction identical to the polarized-light transmission axis of the polarized-light separating element 12. Through this process, polarized light reflected by the polarized-light separating element 12 is converted into polarized light having a polarization direction perpendicular to that of the polarized light before the conversion, and is incident on the polarized-light separating element 12 again. Almost all of the returning light passes through the polarized-light separating element 12.

In brief, very high efficiency for light utilization is achievable by arranging the optical sheet such that (i) the polarized-light transmission axis of the polarized-light separating element 12 is parallel to the transmission axis of the back surface polarizer of the liquid crystal panel and that (ii) the ¼ wavelength plate 11 and the phase-difference plate 10 are provided to satisfy the conditions (1) and (2) above.

In a case where the second prisms are replaced by light reflecting sections 24 as in the optical sheet 25 of Embodiment 2, very high efficiency for light utilization is achievable by arranging the optical sheet such that (i) the polarized-light transmission axis of the polarized-light separating element 12 is parallel to the transmission axis of the back surface polarizer of the liquid crystal panel and that (ii) the ¼ wavelength plate 11 is provided to satisfy the condition (1) above. The condition (2) above intends to produce the same effect as that produced by the light reflecting sections 24 reflecting light to impart a phase difference of $\lambda/2$ to the light.

(Angle-Dependent Characteristic of Rate of Reuse of Polarized Light)

Embodiment 1 uses the phase-difference plate 10 to correct a phase shift caused by total reflection. However, in a case where light does not travel in a direction perpendicular to the direction in which the prisms have a uniform shape (that is, the direction in which the prisms extend), in other words, in a case where light does not travel in a direction parallel to the x-z plane, the light will unfortunately be incident on the second prisms 14 at an unintended angle, and the plane of incidence (that is, the plane on which the path of incident light and the path of reflected light are present) will not coincide with the x-z plane. As illustrated in FIG. 3, a change in the angle of incidence on the second prisms 14 will unfortunately change the phase difference that the second prisms 14 cause. Further, a shift of the plane of incidence from the x-z plane will also change the phase difference to be caused between (i) polarized light having a polarization direction along the y direction and (ii) polarized light having a polarization direction perpendicular to the y direction.

Figure 12:
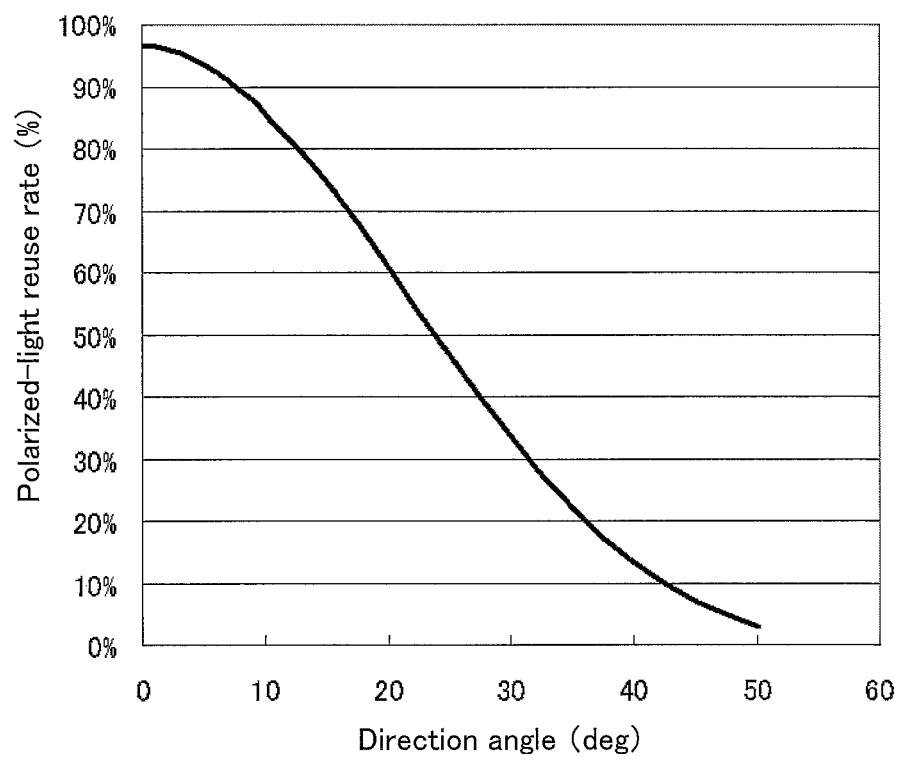
FIG. 12 is a graph showing a rate of reuse of polarized light with respect to different directions in which light travels through the optical sheet illustrated in FIG. 4.

FIG. 12 is a graph showing a rate of reuse of polarized light with respect to different directions in which light travels through the optical sheet 5 illustrated in FIG. 4. The "DIRECTION ANGLE" refers to the angle of a light traveling direction with respect to the x direction as viewed from the front surface side of the optical sheet 5 (that is, on the x-y plane). The rate of reuse of polarized light refers to that proportion of polarized light reflected by the polarized-light separating element 12 which is converted into polarized light that the polarized-light separating element 12 transmits and which returns to the polarized-light separating element 12. FIG. 12 indicates that a larger direction angle results in a lower rate of reuse of polarized light.

Thus, in Embodiment 1, which uses total reflection, light emitted from the light-emitting section 4 toward the optical sheet 5 preferably travels in a direction having small angular distribution (that is, at a small angle with respect to the x-z plane). Embodiment 1 preferably includes a light source having low direction angle distribution (that is, having high directivity on the x-y plane).

Embodiment 2, on the other hand, includes the light reflecting sections 24 (flat surfaces) for reflection of circularly polarized light to reverse its rotation direction. Since the light reflecting sections 24 each include a metal film for reflection, even in a case where a change in direction angle has changed the angle of incidence, light does not undergo a large phase shift when reflected by the light reflecting sections 24. Thus, in Embodiment 2, even a large direction angle does not result in a large decrease in the rate of reuse of polarized light.

Therefore, the optical sheet 25 of Embodiment 2 may simply be used in a case where the liquid crystal display device includes a light-emitting section that emits light having high direction angle distribution, whereas the optical sheet 5 of Embodiment 1 may simply be used in a case where the liquid crystal display device includes a light-emitting section that emits light having low direction angle distribution.

(Variation of Backlight)

Figure 13:
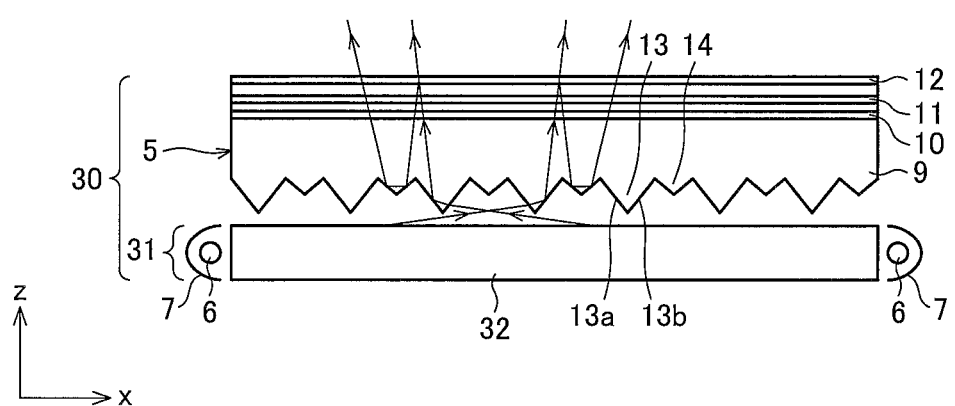
FIG. 13 is a cross-sectional view illustrating a configuration of a backlight of a variation.

FIG. 13 is a cross-sectional view illustrating a configuration of a backlight 30 as a variation of the backlight 2 of Embodiment 1. The backlight 30 includes the optical sheet 5 and a light-emitting section 31. The light-emitting section 31 includes a light guide plate 32, two light sources 6 provided respectively at opposite ends of the light guide plate 32, and two reflectors 7 provided respectively at the opposite ends. The light guide plate 32 receives light emitted by the two light sources at the opposite ends, which causes the light guide plate 32 to emit light in two opposite directions (left and right).

As illustrated in FIG. 13, the first prisms 13 are each in the shape of an isosceles triangle. The optical sheet 5 thus has a similar optical characteristic for light incident on either of the two inclined surfaces (that is, the first surface 13a and the second surface 13b) of each first prism 13. The backlight 30 is, therefore, capable of (i) converting light of both the light sources 6 into linearly polarized light efficiently and (ii) emitting the linearly polarized light toward a front surface side of the backlight 30.

Figure 14:
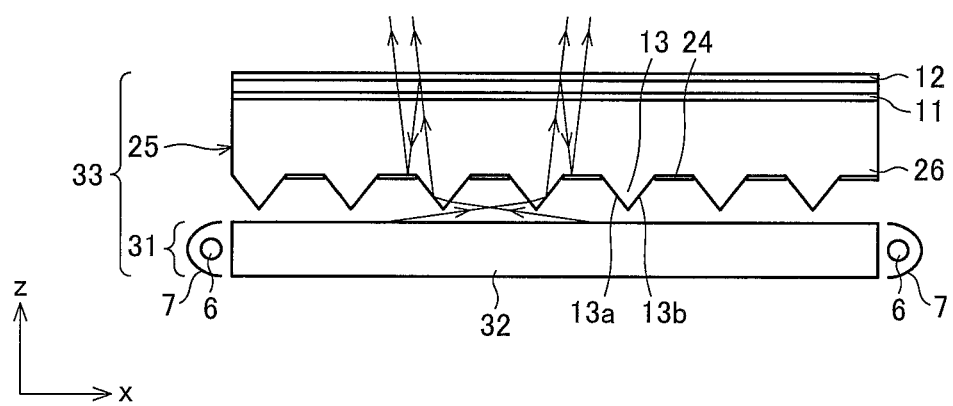
FIG. 14 is a cross-sectional view illustrating a configuration of a backlight of another variation.

FIG. 14 is a cross-sectional view illustrating a configuration of a backlight 33 as a variation of the backlight 22 of Embodiment 2. The backlight 33 includes the optical sheet 25 and a light-emitting section 31.

The optical sheet 25, as well as the optical sheet 5, has a similar optical characteristic for light incident on either of the two inclined surfaces (that is, the first surface 13a and the second surface 13b) of each first prism 13. The backlight 33 is, therefore, capable of (i) converting light of both the light sources 6 into linearly polarized light efficiently and (ii) emitting the linearly polarized light toward a front surface side of the backlight 33.

[Embodiment 3]

Another embodiment of the present invention is described below. For convenience of explanation, members and arrangements of the present embodiment that are identical in function to those described for Embodiment 1 with reference to drawings are each assigned a common reference numeral, and are not described here in detail. The present embodiment includes a backlight that is particularly suitably used in a compact portable terminal such as a smart phone and a mobile telephone, each of which includes a compact liquid crystal display device.

Figure 15:
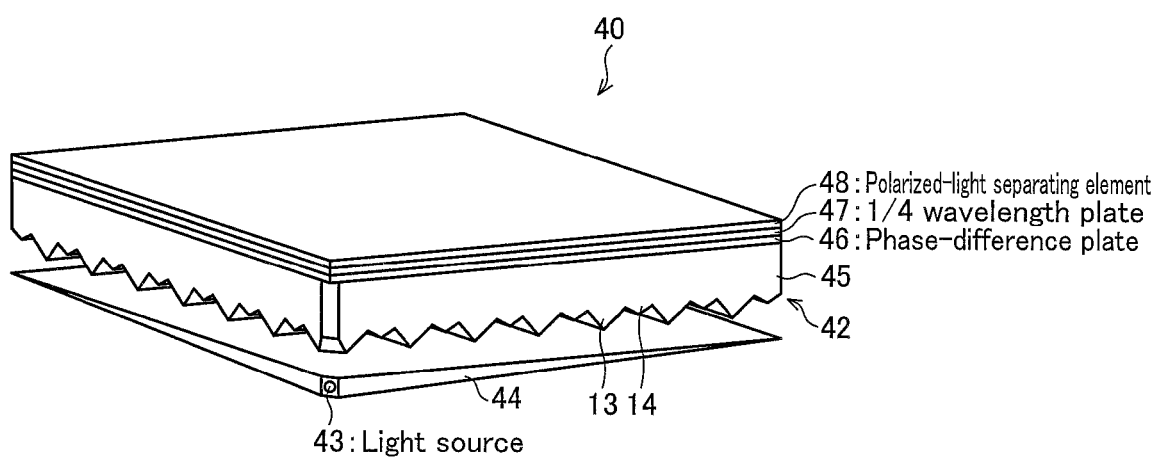
FIG. 15 is a perspective view illustrating a configuration of a backlight of still another embodiment of the present invention.
Figure 16:
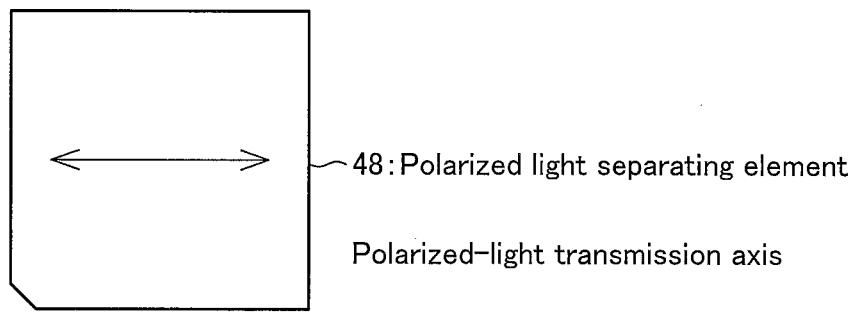
FIG. 16 shows plan views indicative of optical axes and the like of individual optical members placed on top of each other as viewed from a front surface side of the optical members.
Figure 16:
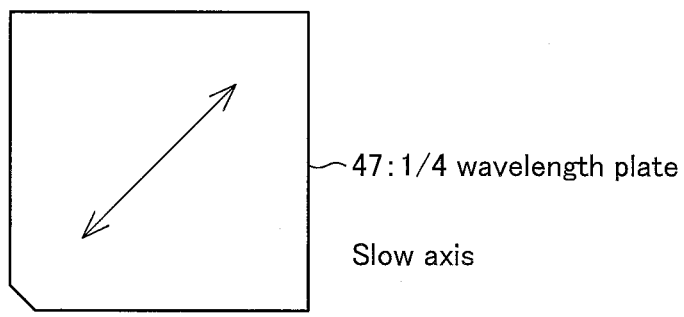
Figure 16:
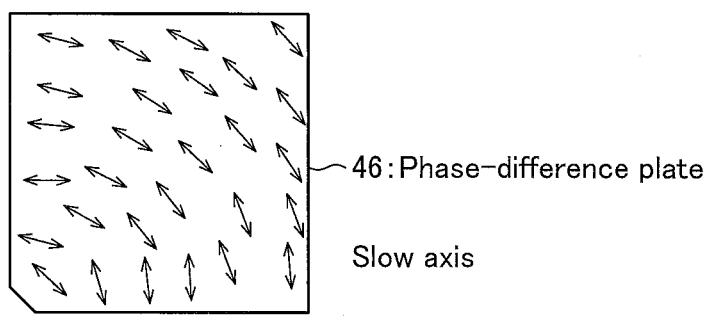
Figure 16:
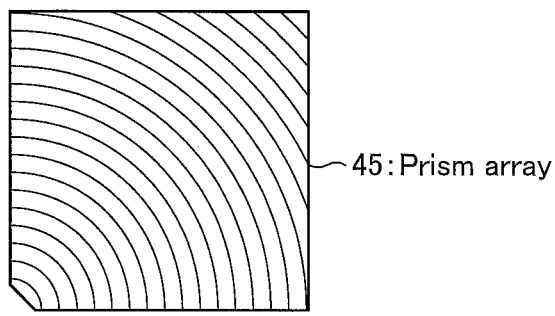

FIG. 15 is a perspective view illustrating a configuration of a backlight 40 of the present embodiment. FIG. 16 shows plan views indicative of optical axes and the like of individual optical members placed on top of each other as viewed from a front surface side of the optical members.

The backlight 40 includes a light-emitting section 41 and an optical sheet 42 provided on a front surface side of the light-emitting section 41. The light-emitting section 41 includes a light source 43 and a light guide plate 44.

The light source 43 is a point light source provided at a corner of the substantially rectangular light guide plate 44. The light source 43 may be, for example, an LED or a compact organic EL device. The light source 43 emits light, which enters the light guide plate 44 and travels therethrough while spreading radially.

The light guide plate 44 has a cross section in a shape tapering from (i) the corner at which the light source 43 is provided to (ii) the opposite end thereof, the thickness of the light guide plate 44 being larger at the entry end and smaller at the opposite end. The light emitted from the light guide plate 44 travels at an angle substantially parallel to the emission surface of the light guide plate 44.

The optical sheet 42 receives unpolarized light emitted from the light guide plate 44 and incident on a back surface of the optical sheet 42, changes the unpolarized light into linearly polarized light, and emits the linearly polarized light from a front surface (emission surface) thereof. The optical sheet 42 includes a prism array 45, a phase-difference plate 46, a ¼ wavelength plate 47, and a polarized-light separating element 48 in that order from a back surface side of the optical sheet 42 to a front surface side thereof (that is, from a light entry side to a light emission side).

The prism array 45 is provided on the back surface side of the optical sheet 42, and includes a plurality of first prisms 13 and a plurality of second prisms (light reflecting sections) 14. The first prisms 13 each have a vertex angle (that is, the angle of its vertex) smaller than that of each second prism 14. The first prisms 13 and the second prisms 14 have their respective vertices (edge lines) arranged concentrically with the position of the light source 43 as the center. Light having entered the optical sheet 42 travels in directions spreading radially from the light source 43. Thus, with each prism in a concentric shape, light strikes each first prism 13 invariably in a direction orthogonal to the first surface 13a of the first prism 13 (as viewed from a front surface side of the first prism 13). The first prisms 13 and the second prisms 14 are provided alternately along the radial direction.

As illustrated in FIG. 16, the phase-difference plate 46 has a slow axis extending concentrically along the circumferential direction with the position of the light source as the center. This is because the slow axis of the phase-difference plate 46 is preferably parallel to the direction in which the second prisms 14 extend (that is, the circumferential direction). Such a phase-difference plate having a concentrically extending slow axis may be produced by, for example, combining a plurality of sectors of phase-difference plates arranged in the circumferential direction.

Figure 17:
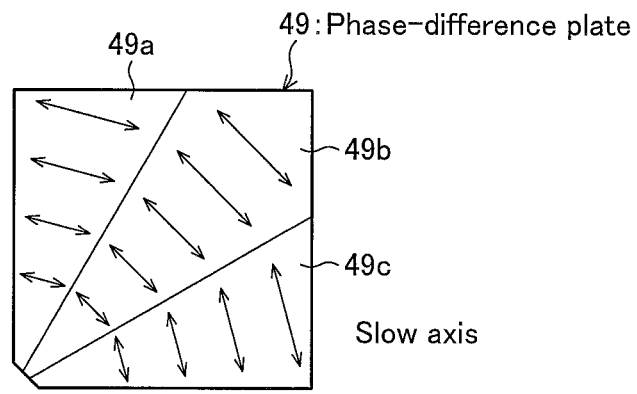
FIG. 17 is a plan view of an example phase-difference plate having a slow axis extending concentrically in a simulated manner.

FIG. 17 is a plan view of an example phase-difference plate 49 having a slow axis extending concentrically in a simulated manner. This phase-difference plate 49 includes a combination of three phase-difference plate parts 49a to 49c each in a sector shape (triangle shape). The phase-difference plate parts 49a to 49c each have a slow axis extending in a single direction. FIG. 17 illustrates an example including three phase difference parts to form a phase-difference plate 49 having a concentrically extending slow axis. Using more phase difference parts makes it possible to form a phase-difference plate 46 having a slow axis extending more concentrically.

The ¼ wavelength plate 47 has a slow axis angled at 45 degrees with respect to the polarized-light transmission axis of the polarized-light separating element 48.

The prism array 45, the phase-difference plate 46, the ¼ wavelength plate 47, and the polarized-light separating element 48 are integrated with each other to form the optical sheet 42.

The second prisms 14 of the prism array 45 of the present embodiment each have a reflecting surface perpendicular to the plane of incidence of light emitted by the point light source (that is, the plane on which the path of incident light and the path of reflected light are present). With this arrangement, the optical sheet 42 causes linearly polarized light reflected by the polarized-light separating element 48 to be efficiently converted with the use of the ¼ wavelength plate 47, the phase-difference plate 46, and the second prisms 14 into linearly polarized light having a polarization direction orthogonal to that of the linearly polarized light at the time of the reflection by the polarized-light separating element 48. This means that the optical sheet 42 allows efficient reuse of polarized light.

Further, the backlight 40, which includes a point light source (that is, the light source 43), can be downsized easily.

The first prisms 13 and the light reflecting section 24 of the prism array 26 of Embodiment 2 may alternatively be arranged to extend concentrically as in the present embodiment to form an optical sheet.

[Embodiment 4]

Another embodiment of the present invention is described below. For convenience of explanation, members and arrangements of the present embodiment that are identical in function to those described for Embodiment 1 with reference to drawings are each assigned a common reference numeral, and are not described here in detail. The present embodiment differs from Embodiment 1 in how the optical sheet is arranged.

Figure 18:
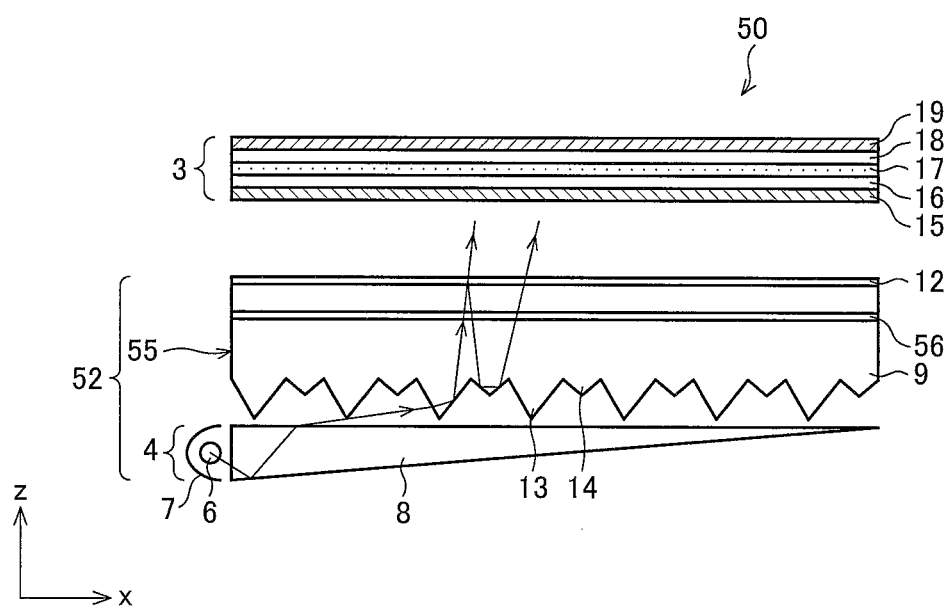
FIG. 18 is a cross-sectional view illustrating a configuration of a liquid crystal display device of still another embodiment of the present invention.

FIG. 18 is a cross-sectional view illustrating a configuration of a liquid crystal display device 50 of the present embodiment. FIG. 18 shows arrows to indicate an example optical path of light from a light source 6. The liquid crystal display device 50 includes a backlight 52 and a liquid crystal panel 3 provided on a front surface side of the backlight 52 (that is, in the direction of a user). The description below uses (i) the term "x direction" to refer to a direction that extends from one end of the liquid crystal display device 50 at which end the light source 6 is provided to the other end, (ii) the term "z direction" to refer to a direction that extends from a back surface of the liquid crystal display device 50 to a front surface thereof, and (iii) the term "y direction" to refer to a direction perpendicular to the x direction and the z direction.

The back surface polarizer 15 of the liquid crystal panel 3 has a polarized-light transmission axis that coincides with the polarized-light transmission axis of the polarized-light separating element 12. In the present embodiment, the polarized-light transmission axis of the liquid crystal panel 3 of the back surface polarizer 15 is angled at 45 degrees with respect to x direction.

The backlight 52 includes a light-emitting section 4 and an optical sheet (optical film) 55 provided on a front surface side of the light-emitting section 4. The light-emitting section 4 includes a light source 6, a reflector 7, and a light guide plate 8.

(Arrangement of Optical Sheet)

The optical sheet 55 receives unpolarized light emitted from the light guide plate 8 and incident on a back surface of the optical sheet 55, changes the unpolarized light into linearly polarized light, and emits the linearly polarized light from a front surface (emission surface) thereof toward the liquid crystal panel 3. The optical sheet 55 includes a prism array 9, a phase-difference plate 56, and a polarized-light separating element 12 in that order from a back surface side of the optical sheet 55 to a front surface side thereof (that is, from a light entry side to a light emission side).

Figure 19:
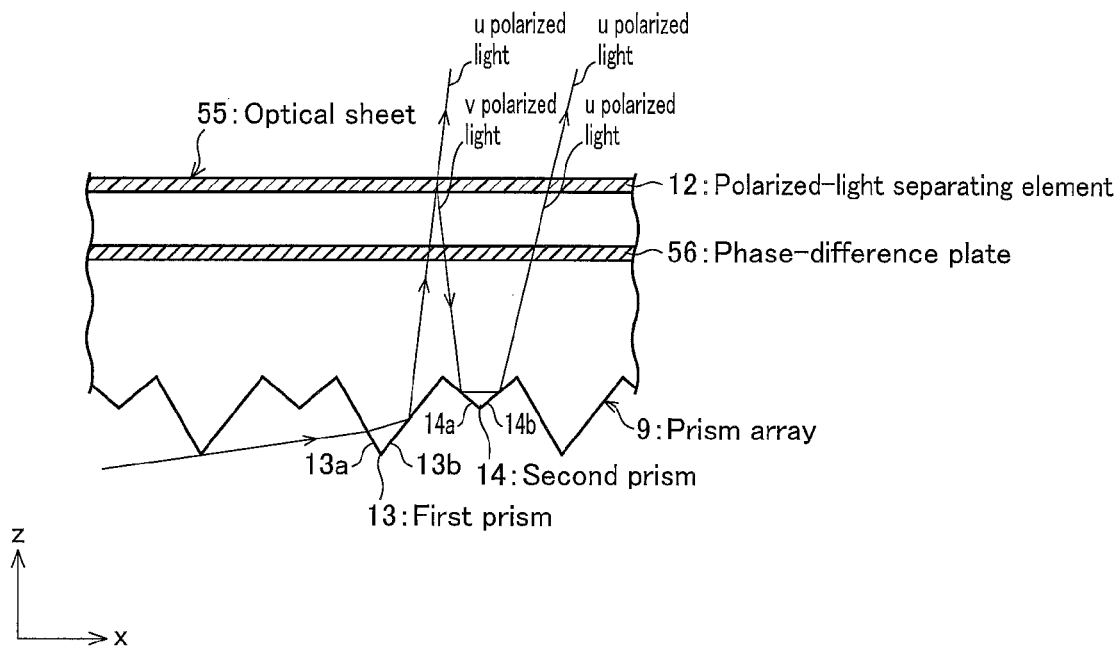
FIG. 19 is an enlarged cross-sectional view of a portion of an optical sheet.
Figure 19:
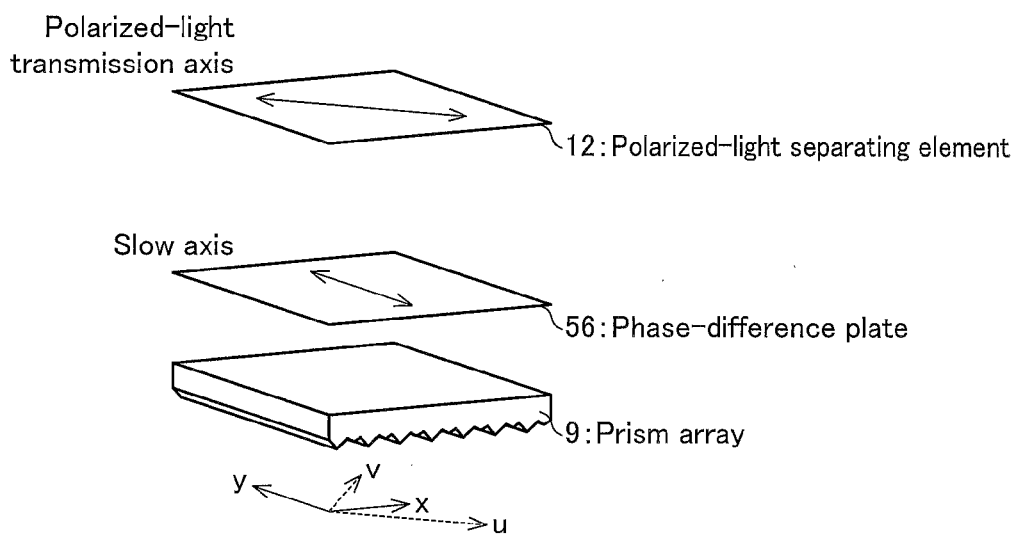
Figure 20:
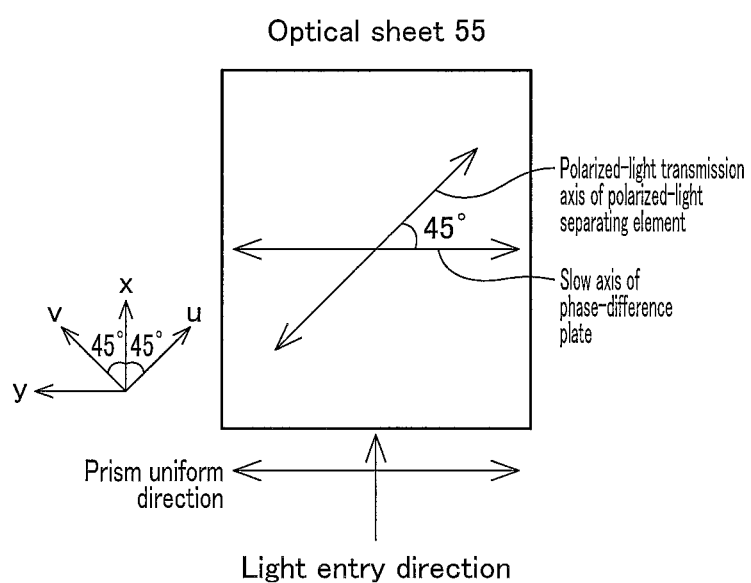
FIG. 20 is a diagram illustrating the angle of an optical axis of each optical member of the optical sheet as viewed from the front surface side thereof.

FIG. 19 is an enlarged cross-sectional view of a portion of the optical sheet 55. FIG. 19 further illustrates respective optical axes of the individual layers. FIG. 19 shows arrows to indicate an example optical path of light emitted from the light guide plate 8 and incident on the optical sheet 55. FIG. 20 is a diagram illustrating the angle of an optical axis of each optical member of the optical sheet 55 as viewed from the front surface side thereof.

The optical sheet 55 includes (i) a prism array 9 on its back surface side, (ii) a phase-difference plate (first phase-difference plate) 56 on a front surface side of the prism array 9, and (iii) a polarized-light separating element 12 on a front surface side of the phase-difference plate 56. The polarized-light separating element 12 is similar in arrangement to that of Embodiment 1. The polarized-light separating element 12 of the present embodiment has a polarized-light transmission axis (that is, the direction of polarization of light that the polarized-light separating element 12 transmits) angled at 45 degrees with respect to the x direction.

The prism array 9 includes a plurality of first prisms 13 and a plurality of second prisms 14. The first prisms 13 and the second prisms 14 are provided alternately along the direction (x direction) extending away from the light source 6. The prism array 9 has a shape that is uniform along the direction (y direction) in which the first prisms 13 extend. The first prisms 13 and the second prisms 14 are similar in arrangement to those of Embodiment 1.

The phase-difference plate 56 imparts a predetermined phase difference to light having a wavelength λ and passing through the phase-difference plate 56 in its thickness direction. A later description will deal in detail with the size of the phase difference that the phase-difference plate 56 imparts. The phase-difference plate 56 has a slow axis along the y direction.

The polarized-light separating element 12 transmits only light polarized in a certain direction, and reflects light polarized in a direction perpendicular to that certain direction. The polarized-light separating element 12 has a polarized-light transmission axis (that is, the direction of polarization of light that the polarized-light separating element 12 transmits) angled at 45 degrees with respect to the x direction.

The prism array 9, the phase-difference plate 56, and the polarized-light separating element 12 are integrated with each other to form the optical sheet 5. The phase-difference plate 56 and the polarized-light separating element 12 may be in contact with each other or separated from each other. In a case where the phase-difference plate 56 and the polarized-light separating element 12 are separated from each other, the phase-difference plate 56 and the polarized-light separating element 12 are preferably separated from each other by a space filled with either a material of the prism array 9 or a material (adhesive) having a refractive index close to those of materials of the individual layers. This arrangement can reduce reflectance at the interface between the individual layers (namely, the phase-difference plate 56 and the polarized-light separating element 12), with the result of increased efficiency for light utilization. The above arrangement can reduce reflectance at the interface of the polarized-light separating element 12 for only light polarized in a direction parallel to the polarized-light transmission axis (that is, the direction of polarization of light that the polarized-light separating element 12 transmits): The polarized-light separating element 12 has high reflectance at the interface for light polarized in a direction perpendicular to the polarized-light transmission axis (that is, the direction of polarization of light that the polarized-light separating element 12 does not transmit).

(How Optical Sheet Polarizes Light)

With reference to FIGS. 18 and 19, the description below deals with how light having entered the optical sheet 55 behaves. FIG. 19 illustrates polarization states at different positions.

Light is emitted from the emission surface of the light guide plate 8 in an unpolarized state at an angle close to the x direction. The light emitted from the emission surface of the light guide plate 8 thus strikes the first surface 13a of each first prism 13, which protrudes toward the light guide plate 8.

The light incident on the first surface 13a of each first prism 13 is refracted by the first surface 13a and is then reflected (total reflection) by the second surface 13b. This arrangement causes light having entered the optical sheet 55 to change its direction to a direction close to the direction (z direction) perpendicular to the emission surface of the optical sheet 55. The present embodiment adjusts, for example, the direction in which light is emitted from the light guide plate 8 and the angle of each first prism 13 so that light reflected by the second surface 13b travels in a direction that is not exactly parallel to the z direction but is slightly inclined from the z direction toward the x direction. If light reflected by the second surface 13b travels in a direction exactly parallel to the z direction, polarized light reflected by the polarized-light separating element 12 will unfortunately travel back along the same optical path to be emitted from the first surface 13a.

The light reflected by the second surface 13b passes through the phase-difference plate 56. The light reflected by the second surface 13b is in an unpolarized state. The polarization state of that light is thus not changed by the phase-difference plate 56, with the result that the light remains unpolarized even after passing through the phase-difference plate 56.

The light having passed through the phase-difference plate 56 and then reached the polarized-light separating element 12 is separated into two portions: polarized light passing through the polarized-light separating element 12 and polarized light reflected by the polarized-light separating element 12. The polarized-light separating element 12 has a polarized-light transmission axis angled at 45 degrees with respect to the x direction. The present embodiment uses (i) the term "u direction" to refer to the direction in which the polarized-light transmission axis of the polarized-light separating element 12 extends and (ii) the term "v direction" to refer to the direction perpendicular to the u direction on the x-y plane. The u direction is angled at 45 degrees with respect to the x direction, whereas the v direction is angled at 45 degrees with respect to the x direction toward an opposite direction. The polarized-light separating element 12 transmits light polarized in a direction parallel to the u direction, and reflects light polarized in a direction perpendicular to the u direction (that is, parallel to the v direction). The light reflected by the polarized-light separating element 12 is thus light polarized in a direction parallel to the v direction (hereinafter referred to as "v-direction polarized light"). The polarized-light separating element 12 reflects v-direction polarized light so that the v-direction polarized light travels back toward the third surface 14a of each second prism 14. The polarized light having passed through the polarized-light separating element 12 and having a polarization direction parallel to the u direction is emitted from the emission surface of the optical sheet 55 toward the liquid crystal panel 3.

Next, the light reflected by the polarized-light separating element 12 (v-direction polarized light) passes through the phase-difference plate 56. The light is then totally reflected by the third surface 14a of each second prism 14, and is thereafter totally reflected by the fourth surface 14b to subsequently pass through the phase-difference plate 56 again. This means that light reflected by the polarized-light separating element 12 is subjected to (i) two phase difference changes caused by the phase-difference plate 56 and (ii) two other phase difference changes caused by total reflection, before returning to the polarized-light separating element 12. The phase-difference plate 56 is arranged to impart a phase difference such that the linearly polarized light (v-direction polarized light) reflected by the polarized-light separating element 12 returns to the polarized-light separating element 12 as linearly polarized light having a polarization direction parallel to the u direction, which is perpendicular to the v direction.

With the above arrangement, the light reflected by the polarized-light separating element 12 is polarized in the v direction with respect to the direction in which the light travels from the polarized-light separating element 12 to the phase-difference plate 56. The light is totally reflected by the second prisms 14 to travel back toward the polarized-light separating element 12 in a reversed direction. This means that in order to become linearly polarized light having a polarization direction parallel to the u direction, a phase difference of mλ (where m is an integer) between an x component and a y component needs to be imparted to the light returning to the polarized-light separating element 12. The phase-difference plate 56 and the second prisms 14 thus impart, to the v-direction polarized light reflected by the polarized-light separating element 12, a total phase difference of λ between the x component and the y component (that is, a phase shift amount of 2π or a phase shift amount of 0) before the v-direction polarized light returns to the polarized-light separating element 12. The present embodiment includes a phase-difference plate 56 having a phase difference and slow axis that cause a phase delay of 2π in the y component relative to the x component. The phase-difference plate 56 may, as described above, simply have a phase difference so selected in consideration of a phase shift by total reflection that when the v-direction polarized light has been divided into P polarized light and S polarized light, the S polarized light has a phase delay of 2π relative to the P polarized light.

In a case where, for instance, a single instance of total reflection causes a phase difference of approximately 44.55 degrees (between P polarized light and S polarized light) as in Embodiment 1, using a phase-difference plate 56 having a phase difference of approximately 3λ/8 (135 degrees) allows most of the v-direction polarized light reflected by the polarized-light separating element 12 to be converted into linearly polarized light having a polarization direction parallel to the u direction.

With the above arrangement, the light is totally reflected twice by the second prisms 14 and then passes through the phase-difference plate 56 toward the polarized-light separating element 12 to be converted into linearly polarized light having a polarization direction parallel to the u direction.

Since the light having been reflected by the second prisms 14 and then passed through the phase-difference plate 56 is linearly polarized light having a polarization direction parallel to the u direction, the light can pass through the polarized-light separating element 12. The linearly polarized light having passed through the polarized-light separating element 12 and having a polarization direction parallel to the u direction is emitted from the emission surface of the optical sheet 55 to strike the liquid crystal panel 3.

As the result of the process described above, only linearly polarized light having a polarization direction parallel to the u direction is emitted from the emission surface of the optical sheet 55 (that is, the surface facing the liquid crystal panel 3). Further, v-direction polarized light having been reflected by the polarized-light separating element 12 to travel back toward the second prisms 14 is converted into linearly polarized light having a polarization direction parallel to the u direction by the polarized light converting elements (namely, the phase-difference plate 56 and the second prisms 14) to be emitted from the optical sheet 55. The optical sheet 55 consequently makes it possible to (i) highly efficiently utilize light that is incident from the light-emitting section 4 on the optical sheet 55 and to (ii) emit only linearly polarized light (that is, linearly polarized light having a polarization direction parallel to the u direction) at an angle close to 90 degrees with respect to the emission surface.

The present embodiment stacks up all of the prism array 9, the polarized-light separating element 12, and the polarized light converting element (namely, the phase-difference plate 56) to integrally form an optical sheet 55. This arrangement eliminates the need for alignment of the individual optical members, and facilitates assembly of the liquid crystal display device 50, thereby reducing the cost of producing the liquid crystal display device 50. Further, the above arrangement, which allows the individual optical members to integrally form an optical sheet 55, allows production of an optical sheet 55 that is large-sized for use in a large screen yet reduced in thickness. This in turn allows production of a thin liquid crystal display device 50.

Further, the present embodiment is arranged such that the individual optical members (namely, the polarized-light separating element 12 and the phase-difference plate 56) are in contact with each other or that the individual optical members are separated from each other by a material having a refractive index equivalent or close to those of the individual optical members. This arrangement allows the optical sheet 55 to cause only a small refractive index change inside itself as compared at least to a conventional technique involving different optical members separated from each other by air or the like. With the above arrangement, polarized light reflected by the polarized-light separating element 12 (v-direction polarized light) is converted through the optical sheet 55, which causes only a small refractive index change, into light that is polarized so as to be able to pass through the polarized-light separating element 12. The above arrangement can thus almost completely eliminate a light loss caused by Fresnel reflection at the interface between the individual optical members. Further, the present embodiment, as compared to Embodiment 1, does not need to include a ¼ wavelength plate. This can further reduce a loss caused by Fresnel reflection inside the optical sheet 55, thereby improving efficiency for light utilization. The above arrangement, in addition, further facilitates production of the optical sheet 55.

In a case where the polarized-light separating element has a transmission axis that is not angled at 45 degrees with respect to the direction in which the second prisms extend, the optical sheet 55 may include a ½ wavelength plate between the polarized-light separating element and the phase-difference plate so that light (linearly polarized light) having been reflected by the polarized-light separating element and passed through the ½ wavelength plate has a polarization direction angled at 45 degrees with respect to the direction in which the second prisms extend.

[Recap]

An optical film of one mode of the present invention is an optical film including, in sequence from a light entry side of the optical film to a light emission side of the optical film: a plurality of first prisms; a first phase-difference plate; and a polarized-light separating element, the plurality of first prisms each having (i) a first surface through which light enters the first prism and (ii) a second surface that reflects the light, having entered the first prism through the first surface, toward the light emission side, the optical film further including, between the plurality of first prisms in an in-plane direction of the optical film, a light reflecting section that reflects light, having been reflected by the polarized-light separating element toward the light entry side, back toward the light emission side.

The above arrangement causes polarized light reflected by the polarized-light separating element to be converted by the first phase-difference plate and the light reflecting section, both included in the optical film, into polarized light that is capable of passing through the polarized-light separating element. With the above arrangement, the optical film allows light having entered the optical film in an unpolarized state to be converted efficiently into polarized light that is capable of passing through the polarized-light separating element, and allows such polarized light to be emitted. Further, the polarized-light separating element and the first phase-difference plate are included in the optical film. This can reduce the difference in refractive index at the respective boundary surfaces of the polarized-light separating element and the first phase-difference plate, and can thus reduce Fresnel reflectance at the respective boundary surfaces of the polarized-light separating element and the first phase-difference plate, with the result of reduction in a light loss caused by Fresnel reflection. In addition, the polarized-light separating element, the first phase-difference plate, and the light reflecting section are included in the optical film. This allows production of a thin optical film that allows light in an unpolarized state to be converted into predetermined polarized light and that allows such polarized light to be emitted. Furthermore, since the polarized-light separating element, the first phase-difference plate, and the light reflecting section are included in the optical film, there is no need for, for example, alignment of the individual optical members. Also, the polarized-light separating element, the first phase-difference plate, and the light reflecting section, which are included in the optical film, may be stacked up on top of each other for integral production. This facilitates assembly of the optical film to an optical product such as a liquid crystal display device, and can consequently reduce the cost of producing an optical product including the optical film.

The optical film may be arranged such that the first phase-difference plate is a ¼ wavelength plate.

The optical film may be arranged such that the light reflecting section is a second prism having a third surface and a fourth surface each of which reflects light; an angle between the third surface and the fourth surface is larger than an angle between the first surface and the second surface; and the optical film further includes a second phase-difference plate between the ¼ wavelength plate and the second prism.

The optical film may be arranged such that the second phase-difference plate imparts a phase difference of not greater than $\lambda/4$ and not less than $\lambda/12$ to light having a wavelength $\lambda$, where the wavelength $\lambda$ is a representative wavelength of incident light. The optical film may be arranged such that the second phase-difference plate imparts a phase difference of not greater than $\lambda/6$ and not less than $\lambda/12$ to light having a wavelength $\lambda$, where the wavelength $\lambda$ is a representative wavelength of incident light.

The optical film may be arranged such that the second phase-difference plate has a slow axis that is parallel to a direction in which the second prism extends.

The optical film may be arranged such that two passages through the second phase-difference plate, total reflection at the third surface, and total reflection at the fourth surface cause a phase shift in a total amount of $\pi$.

The optical film may be arranged such that the light reflecting section totally reflects the light, having been reflected by the polarized-light separating element toward the light entry side, at each of the third surface and the fourth surface toward the light emission side.

The optical film may be arranged such that the light reflecting section is a second prism having a third surface and a fourth surface each of which reflects light; and two passages through the first phase-difference plate, total reflection at the third surface, and total reflection at the fourth surface cause a phase shift in a total amount of $2\pi$.

The optical film may be arranged such that the first phase-difference plate has a slow axis that is parallel to a direction in which the second prism extends; and the polarized-light separating element has a polarized-light transmission axis that is angled at 45 degrees with respect to the direction in which the second prism extends.

The optical film may be arranged such that the plurality of first prisms each have a cross section in a shape of an isosceles triangle along a direction in which the plurality of first prisms and the light reflecting section are arranged next to each other.

The optical film may be arranged such that the first surface and the second surface of each of the plurality of first prisms are symmetrical to each other with respect to a direction perpendicular to a surface of the polarized-light separating element.

The optical film may be arranged such that the light reflecting section has a reflecting surface that is parallel to the polarized-light separating element.

The optical film may be arranged such that the light reflecting section includes a metal film that reflects light.

The optical film may be arranged such that the plurality of first prisms and the light reflecting section are provided concentrically.

(16)

The optical film may further include a ½ wavelength plate between the first phase-difference plate and the polarized-light separating element, wherein: the light reflecting section is a second prism having a third surface and a fourth surface each of which reflects light; two passages through the first phase-difference plate, total reflection at the third surface, and total reflection at the fourth surface cause a phase shift in a total amount of $2\pi$; and the polarized-light separating element and the ½ wavelength plate are disposed so that light having been reflected by the polarized-light separating element and passed through the ½ wavelength plate has a polarization direction angled at 45 degrees with respect to a direction in which the second prism extends.

(17)

A backlight of one mode of the present invention includes: the optical film; and a light-emitting section disposed on the light entry side of the optical film, the light-emitting section emitting light toward the first surface of each of the plurality of first prisms included in the optical film.

(18)

The backlight may be arranged such that the light-emitting section includes a light source and a light guide plate.

(19)

A liquid crystal display device of one mode of the present invention includes: the backlight; and a liquid crystal panel disposed on a light emission side of the backlight.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention is applicable to an optical sheet for use in a liquid crystal display device and to a backlight.

REFERENCE SIGNS LIST 1, 20, 50 liquid crystal display device
2, 22, 30, 33, 40, 52 backlight
3 liquid crystal panel
4, 31, 41 light-emitting section
5, 25, 27, 28, 29, 42, 55 optical sheet
6, 43 light source
7 reflector
8, 32, 44 light guide plate
9, 26, 45 prism array
10, 46, 49 phase-difference plate (second phase-difference plate)
56 phase-difference plate (first phase-difference plate)
11, 47 ¼ wavelength plate (first phase-difference plate)
12, 48 polarized-light separating element
13 first prism
13a first surface
13b second surface
14 second prism (light reflecting section)
14a third surface
14b fourth surface
15 back surface polarizer
16 active matrix substrate
17 liquid crystal layer
18 color filter substrate
19 front surface polarizer
24 light reflecting section

The invention claimed is:

1. An optical film comprising, in sequence from a light entry side of the optical film to a light emission side of the optical film:
   a plurality of first prisms;
   a first phase-difference plate; and
   a polarized-light separating element, wherein
   the plurality of first prisms each having (i) a first surface through which light enters the first prism and (ii) a second surface that reflects the light, having entered the first prism through the first surface, toward the light emission side;
   the optical film further comprising, between the plurality of first prisms in an in-plane direction of the optical film, a light reflecting section that reflects light, having been reflected by the polarized-light separating element toward the light entry side, back toward the light emission side;
   the first phase-difference plate is a ¼ wavelength plate;
   the light reflecting section is a second prism having a third surface and a fourth surface each of which reflects light;
   an angle between the third surface and the fourth surface is larger than an angle between the first surface and the second surface; and
   the optical film further comprises a second phase-difference plate between the ¼ wavelength plate and the second prism.

2. The optical film according to claim 1, wherein the second phase-difference plate imparts a phase difference of not greater than $\lambda/4$ and not less than $\lambda/12$ to light having a wavelength $\lambda$, where the wavelength $\lambda$ is a representative wavelength of incident light.

3. The optical film according to claim 1, wherein the second phase-difference plate imparts a phase difference of not greater than $\lambda/6$ and not less than $\lambda/12$ to light having a wavelength $\lambda$, where the wavelength $\lambda$ is a representative wavelength of incident light.

4. The optical film according to claim 1, wherein the second phase-difference plate has a slow axis that is parallel to a direction in which the second prism extends.

5. The optical film according to claim 4, wherein
two passages through the second phase-difference plate, total reflection at the third surface, and total reflection at the fourth surface cause a phase shift in a total amount of π.

6. The optical film according to claim 1, wherein
the light reflecting section totally reflects the light, having been reflected by the polarized-light separating element toward the light entry side, at each of the third surface and the fourth surface toward the light emission side.

7. An optical film comprising, in sequence from a light entry side of the optical film to a light emission side of the optical film:
a plurality of first prisms;
a first phase-difference plate; and
a polarized-light separating element,
the plurality of first prisms each having (i) a first surface through which light enters the first prism and (ii) a second surface that reflects the light, having entered the first prism through the first surface, toward the light emission side, the optical film further comprising, between the plurality of first prisms in an in-plane direction of the optical film, a light reflecting section that reflects light, having been reflected by the polarized-light separating element toward the light entry side, back toward the light emission side; wherein the light reflecting section is a second prism having a third surface and a fourth surface each of which reflects light;

two passages through the first phase-difference plate, total reflection at the third surface, and total reflection at the fourth surface cause a phase shift in a total amount of 2π;

the first phase-difference plate has a slow axis that is parallel to a direction in which the second prism extends; and the polarized-light separating element has a polarized-light transmission axis that is angled at 45 degrees with respect to the direction in which the second prism extends.

* * * * *